United States Patent
Itano et al.

(10) Patent No.: US 11,365,335 B2
(45) Date of Patent: Jun. 21, 2022

(54) COMPOSITION COMPRISING REFRIGERANT, USE THEREOF, REFRIGERATING MACHINE HAVING SAME, AND METHOD FOR OPERATING SAID REFRIGERATING MACHINE

(71) Applicant: DAIKIN INDUSTRIES, LTD., Osaka (JP)

(72) Inventors: Mitsushi Itano, Osaka (JP); Daisuke Karube, Osaka (JP); Yuuki Yotsumoto, Osaka (JP); Kazuhiro Takahashi, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/913,628

(22) Filed: Jun. 26, 2020

(65) Prior Publication Data

US 2020/0369934 A1 Nov. 26, 2020

Related U.S. Application Data

(63) Continuation-in-part of application No. 16/955,669, filed as application No. PCT/JP2018/037483 on Oct. 5, 2018.

(30) Foreign Application Priority Data

Dec. 18, 2017 (JP) .............................. JP2017-242185

(51) Int. Cl.
*C09K 5/04* (2006.01)
(52) U.S. Cl.
CPC ........ *C09K 5/045* (2013.01); *C09K 2205/126* (2013.01); *C09K 2205/22* (2013.01); *C09K 2205/40* (2013.01)
(58) Field of Classification Search
CPC ................ C09K 5/045; C09K 2205/40; C09K 2205/126; C09K 2205/22
USPC .................................. 252/67, 68, 69; 62/529
See application file for complete search history.

(56) References Cited

U.S. PATENT DOCUMENTS

| | | | |
|---|---|---|---|
| 5,344,069 A | 9/1994 | Narikiyo | |
| 5,851,968 A | 12/1998 | Schnur | |
| 6,667,285 B1 | 12/2003 | Kawahara et al. | |
| 8,358,040 B2 | 1/2013 | Komuro et al. | |
| 10,131,827 B2 | 11/2018 | Fukushima et al. | |
| 10,883,745 B2 | 1/2021 | Higashiiue et al. | |
| 2002/0140309 A1 | 10/2002 | Yanashima et al. | |
| 2002/0193262 A1 | 12/2002 | Kaimai et al. | |
| 2004/0011062 A1 | 1/2004 | Taira | |
| 2006/0000224 A1 | 1/2006 | Matsuoka | |
| 2007/0209373 A1 | 9/2007 | Taira et al. | |
| 2008/0184723 A1 | 8/2008 | Sato et al. | |
| 2008/0184731 A1 | 8/2008 | Sienel et al. | |
| 2008/0188173 A1 | 8/2008 | Chen et al. | |
| 2009/0260382 A1 | 10/2009 | Takeichi et al. | |
| 2010/0067264 A1 | 3/2010 | Ohashi et al. | |
| 2010/0082162 A1 | 4/2010 | Mundy et al. | |
| 2010/0122545 A1 | 5/2010 | Minor et al. | |
| 2011/0108756 A1 | 5/2011 | Tsuchiya et al. | |
| 2011/0167848 A1 | 7/2011 | Wakashima et al. | |
| 2014/0070132 A1 | 3/2014 | Fukushima | |
| 2014/0077123 A1 | 3/2014 | Fukushima | |
| 2014/0291411 A1 | 10/2014 | Tamaki et al. | |
| 2014/0314606 A1 | 10/2014 | Maeyama et al. | |
| 2014/0373569 A1 | 12/2014 | Tsuboe et al. | |
| 2015/0001981 A1 | 1/2015 | Hattori et al. | |
| 2015/0075203 A1 | 3/2015 | Mochizuki et al. | |
| 2015/0096321 A1 | 4/2015 | Kawano et al. | |
| 2015/0143841 A1 | 5/2015 | Kawano et al. | |
| 2015/0256038 A1 | 9/2015 | Nigo et al. | |
| 2015/0362199 A1 | 12/2015 | Yumoto et al. | |
| 2015/0376486 A1 | 12/2015 | Hashimoto et al. | |
| 2016/0018135 A1 | 1/2016 | Yuzawa et al. | |
| 2016/0075927 A1* | 3/2016 | Fukushima ............ C09K 5/045 252/68 |
| 2016/0276886 A1 | 9/2016 | Baba et al. | |
| 2016/0333241 A1 | 11/2016 | Fukushima et al. | |
| 2016/0333243 A1 | 11/2016 | Fukushima et al. | |
| 2016/0340565 A1* | 11/2016 | Tasaka ................... C09K 5/045 |
| 2016/0348933 A1 | 12/2016 | Takeuchi et al. | |
| 2016/0355719 A1 | 12/2016 | Fukushima et al. | |
| 2017/0002245 A1 | 1/2017 | Fukushima | |
| 2017/0058172 A1 | 3/2017 | Fukushima et al. | |
| 2017/0058173 A1 | 3/2017 | Fukushima | |
| 2017/0058174 A1 | 3/2017 | Fukushima et al. | |
| 2017/0121581 A1 | 5/2017 | Horiike et al. | |
| 2017/0138642 A1 | 5/2017 | Ueno et al. | |
| 2017/0166831 A1 | 6/2017 | Matsumoto | |
| 2017/0248328 A1 | 8/2017 | Eskew et al. | |
| 2017/0328586 A1 | 11/2017 | Maeyama | |
| 2017/0336085 A1 | 11/2017 | Yasuo et al. | |
| 2017/0338707 A1 | 11/2017 | Shono et al. | |
| 2018/0094844 A1 | 4/2018 | Suzuki | |

(Continued)

FOREIGN PATENT DOCUMENTS

| AU | 2001284508 | 3/2002 |
|---|---|---|
| CN | 1288132 | 3/2001 |

(Continued)

OTHER PUBLICATIONS

International Search Report dated Mar. 12, 2019 in International (PCT) Application No. PCT/JP2018/046639.

(Continued)

*Primary Examiner* — Douglas J McGinty
(74) *Attorney, Agent, or Firm* — Wenderoth, Lind & Ponack, L.L.P.

(57) ABSTRACT

An object of the present invention is to provide a mixed refrigerant having three types of performance; i.e., a refrigerating capacity (also referred to as cooling capacity) and a coefficient of performance (COP) that are equivalent to those of R410A, and a sufficiently low GWP. Provided as a means for achieving the object is a composition comprising a refrigerant, the refrigerant comprising trans-1,2-difluoroethylene (HFO-1132(E)), trifluoroethylene (HFO-1123), and 2,3,3,3-tetrafluoro-1-propene (R1234yf).

18 Claims, 1 Drawing Sheet

(56) References Cited

U.S. PATENT DOCUMENTS

| | | | |
|---|---|---|---|
| 2018/0051198 | A1 | 5/2018 | Okamoto et al. |
| 2018/0138763 | A1 | 5/2018 | Nakamura et al. |
| 2018/0156217 | A1 | 6/2018 | Sakima et al. |
| 2018/0156511 | A1 | 6/2018 | Chikami et al. |
| 2018/0254676 | A1 | 9/2018 | Nigo et al. |
| 2018/0299175 | A1 | 10/2018 | Hayamizu et al. |
| 2018/0320942 | A1 | 11/2018 | Hayamizu et al. |
| 2018/0331436 | A1 | 11/2018 | Hayamizu et al. |
| 2018/0358861 | A1 | 12/2018 | Hayamizu et al. |
| 2019/0063773 | A1 | 2/2019 | Nagahashi et al. |
| 2019/0068015 | A1 | 2/2019 | Yabe et al. |
| 2019/0309963 | A1 | 10/2019 | Zaki et al. |
| 2020/0079985 | A1 | 3/2020 | Okamoto et al. |
| 2020/0321816 | A1 | 10/2020 | Watanabe |
| 2020/0325375 | A1* | 10/2020 | Kumakura ............. C09K 5/045 |
| 2020/0325376 | A1* | 10/2020 | Kumakura ............. F25B 9/006 |
| 2020/0325377 | A1* | 10/2020 | Kumakura ............. F25B 9/006 |
| 2020/0326100 | A1* | 10/2020 | Ukibune ................. F28D 1/00 |
| 2020/0326101 | A1* | 10/2020 | Itano ...................... F25B 1/00 |
| 2020/0326102 | A1* | 10/2020 | Kumakura ............. F25B 13/00 |
| 2020/0326103 | A1* | 10/2020 | Kumakura ............. F25B 9/006 |
| 2020/0326105 | A1* | 10/2020 | Kumakura ............. F25B 40/00 |
| 2020/0326109 | A1* | 10/2020 | Kumakura ............. F25B 13/00 |
| 2020/0326110 | A1* | 10/2020 | Asano ................... F25B 31/026 |
| 2020/0332164 | A1* | 10/2020 | Itano ...................... C09K 5/045 |
| 2020/0332166 | A1 | 10/2020 | Kumakura et al. |
| 2020/0333041 | A1 | 10/2020 | Itano et al. |
| 2020/0333054 | A1* | 10/2020 | Asano ................... F04C 18/26 |
| 2020/0347283 | A1* | 11/2020 | Itano ...................... C09K 5/045 |
| 2020/0363085 | A1* | 11/2020 | Itano ...................... F24F 13/20 |
| 2020/0363105 | A1* | 11/2020 | Kumakura ............. C09K 5/045 |
| 2020/0363106 | A1* | 11/2020 | Itano ...................... F28F 1/42 |
| 2020/0363112 | A1* | 11/2020 | Ohtsuka ................. C09K 5/045 |
| 2020/0369934 | A1 | 11/2020 | Itano et al. |
| 2020/0385620 | A1 | 12/2020 | Itano et al. |
| 2020/0385621 | A1 | 12/2020 | Itano et al. |
| 2020/0385622 | A1* | 12/2020 | Itano ...................... C09K 5/04 |
| 2020/0392387 | A1* | 12/2020 | Ohtsuka ................. H02P 27/06 |
| 2020/0392388 | A1 | 12/2020 | Itano et al. |
| 2020/0393178 | A1 | 12/2020 | Kumakura et al. |
| 2021/0018191 | A1* | 1/2021 | Itano ...................... C09K 5/045 |
| 2021/0135520 | A1 | 5/2021 | Shimokawa et al. |
| 2021/0189209 | A1 | 6/2021 | Yotsumoto et al. |
| 2021/0222040 | A1 | 7/2021 | Fukushima et al. |
| 2021/0246348 | A1* | 8/2021 | Itano ...................... C09K 5/045 |
| 2021/0309902 | A1* | 10/2021 | Kumakura ............. F25B 49/02 |
| 2021/0332279 | A1* | 10/2021 | Takahashi ............. C09K 5/045 |
| 2021/0355359 | A1* | 11/2021 | Ohkubo ................. C09K 5/045 |
| 2022/0064509 | A1* | 3/2022 | Itano ...................... C09K 5/045 |

FOREIGN PATENT DOCUMENTS

| | | |
|---|---|---|
| CN | 1447491 | 10/2003 |
| CN | 1455855 | 11/2003 |
| CN | 1723373 | 1/2006 |
| CN | 1987264 | 6/2007 |
| CN | 101235815 | 8/2008 |
| CN | 101441012 | 5/2009 |
| CN | 102401519 | 4/2012 |
| CN | 103562338 | 2/2014 |
| CN | 203704143 | 7/2014 |
| CN | 103975204 | 8/2014 |
| CN | 104094069 | 10/2014 |
| CN | 104456760 | 3/2015 |
| CN | 104578493 | 4/2015 |
| CN | 204534884 | 8/2015 |
| CN | 104903661 | 9/2015 |
| CN | 104937350 | 9/2015 |
| CN | 204648544 | 9/2015 |
| CN | 105102905 | 11/2015 |
| CN | 205261858 | 5/2016 |
| CN | 106029821 | 10/2016 |
| CN | 106030222 | 10/2016 |
| CN | 106062159 | 10/2016 |
| CN | 106085363 | 11/2016 |
| CN | 106103992 | 11/2016 |
| CN | 106133110 | 11/2016 |
| CN | 106414653 | 2/2017 |
| CN | 106414654 | 2/2017 |
| CN | 106415152 | 2/2017 |
| CN | 106574802 | 4/2017 |
| CN | 106661477 | 5/2017 |
| CN | 106839496 | 6/2017 |
| CN | 107110570 | 8/2017 |
| CN | 107112830 | 8/2017 |
| CN | 107429957 | 12/2017 |
| CN | 107614980 | 1/2018 |
| CN | 107925285 | 4/2018 |
| CN | 108139112 | 6/2018 |
| CN | 108431414 | 8/2018 |
| CN | 108469126 | 8/2018 |
| EP | 1 231 255 | 8/2002 |
| EP | 1 246 348 | 10/2002 |
| EP | 1 326 057 | 7/2003 |
| EP | 1 632 732 | 3/2006 |
| EP | 1 953 388 | 8/2008 |
| EP | 2 423 609 | 2/2012 |
| EP | 2 620 736 | 7/2013 |
| EP | 2 711 405 | 3/2014 |
| EP | 2 789 933 | 10/2014 |
| EP | 2 840 335 | 2/2015 |
| EP | 2 853 826 | 4/2015 |
| EP | 2 918 953 | 9/2015 |
| EP | 2 952 828 | 12/2015 |
| EP | 2 980 508 | 2/2016 |
| EP | 3 012 555 | 4/2016 |
| EP | 3 012 557 | 4/2016 |
| EP | 3 070 417 | 9/2016 |
| EP | 3 101 082 | 12/2016 |
| EP | 3 109 302 | 12/2016 |
| EP | 3 115 716 | 1/2017 |
| EP | 3 121 242 | 1/2017 |
| EP | 3 128 259 | 2/2017 |
| EP | 3 147 595 | 3/2017 |
| EP | 3 153 559 | 4/2017 |
| EP | 3 153 561 | 4/2017 |
| EP | 3 170 881 | 5/2017 |
| EP | 3 222 934 | 9/2017 |
| EP | 3 249 309 | 11/2017 |
| EP | 3 299 731 | 3/2018 |
| EP | 3 358 272 | 8/2018 |
| EP | 3 358 278 | 8/2018 |
| EP | 3 399 189 | 11/2018 |
| GB | 2530915 | 4/2016 |
| JP | 51-90115 | 7/1976 |
| JP | 52-13025 | 4/1977 |
| JP | 57-198968 | 12/1982 |
| JP | 59-39790 | 3/1984 |
| JP | 62-69066 | 3/1987 |
| JP | 63-69066 | 3/1987 |
| JP | 2-4163 | 1/1990 |
| JP | 5-264070 | 10/1993 |
| JP | 5-272823 | 10/1993 |
| JP | 7-19627 | 1/1995 |
| JP | 7-190571 | 7/1995 |
| JP | 8-200273 | 8/1996 |
| JP | 10-46170 | 2/1998 |
| JP | 10-300292 | 11/1998 |
| JP | 10-309050 | 11/1998 |
| JP | 10-318564 | 12/1998 |
| JP | 11-206001 | 7/1999 |
| JP | 11-256358 | 9/1999 |
| JP | 2000-161805 | 6/2000 |
| JP | 2000-220877 | 8/2000 |
| JP | 2000-234767 | 8/2000 |
| JP | 2000-304302 | 11/2000 |
| JP | 2001-82755 | 3/2001 |
| JP | 2001-139972 | 5/2001 |
| JP | 2002-54888 | 2/2002 |
| JP | 2002-89978 | 3/2002 |
| JP | 2002-257366 | 9/2002 |
| JP | 2002-272043 | 9/2002 |
| JP | 2002-318028 | 10/2002 |
| JP | 2003-18776 | 1/2003 |

(56) References Cited

FOREIGN PATENT DOCUMENTS

| | | |
|---|---|---|
| JP | 2003-83614 | 3/2003 |
| JP | 2003-174794 | 6/2003 |
| JP | 2004-28035 | 1/2004 |
| JP | 2004-132647 | 4/2004 |
| JP | 2004-215406 | 7/2004 |
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-121654 | 6/2009 |
| JP | 2009-150620 | 7/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |
| JP | 2015-78789 | 4/2015 |
| JP | 2015-82875 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |
| JP | 2015-229767 | 12/2015 |
| JP | 2016-1062 | 1/2016 |
| JP | 2016-11423 | 1/2016 |
| JP | 2016-56340 | 4/2016 |
| JP | 2016-125808 | 7/2016 |
| JP | 2016-133256 | 7/2016 |
| JP | 2016-172869 | 9/2016 |
| JP | 2016-174461 | 9/2016 |
| JP | 2017-36861 | 2/2017 |
| JP | 2017-46430 | 3/2017 |
| JP | 2017-53285 | 3/2017 |
| JP | 2017-67373 | 4/2017 |
| JP | 2017-67428 | 4/2017 |
| JP | 2017-122549 | 7/2017 |
| JP | 2017-145975 | 8/2017 |
| JP | 2017-192190 | 10/2017 |
| JP | 2018-25377 | 2/2018 |
| KR | 2001-0029975 | 4/2001 |
| KR | 2003-0028838 | 4/2003 |
| KR | 10-0939609 | 10/2003 |
| KR | 10-2004-0075737 | 8/2004 |
| KR | 10-2005-0044931 | 5/2005 |
| KR | 10-2017-0034887 | 3/2017 |
| RU | 2013 156 380 | 6/2015 |
| TW | 20030103482 | 2/2003 |
| WO | 01/36571 | 5/2001 |
| WO | 02/23100 | 3/2002 |
| WO | 2009/069679 | 6/2009 |
| WO | 2012/157764 | 11/2012 |
| WO | 2012/157765 | 11/2012 |
| WO | 2013/084301 | 6/2013 |
| WO | 2013/146103 | 10/2013 |
| WO | 2013/146208 | 10/2013 |
| WO | 2013/151043 | 10/2013 |
| WO | 2014/045400 | 3/2014 |
| WO | 2014/118945 | 8/2014 |
| WO | 2014/119149 | 8/2014 |
| WO | 2014/156190 | 10/2014 |
| WO | 2014/203353 | 12/2014 |
| WO | 2014/203354 | 12/2014 |
| WO | 2015/071967 | 5/2015 |
| WO | 2015/115252 | 8/2015 |
| WO | 2015/125763 | 8/2015 |
| WO | 2015/125884 | 8/2015 |
| WO | 2015/136981 | 9/2015 |
| WO | 2015/140827 | 9/2015 |
| WO | 2015/141678 | 9/2015 |
| WO | 2015/186557 | 12/2015 |
| WO | 2015/186670 | 12/2015 |
| WO | 2016/009884 | 1/2016 |
| WO | 2016/017460 | 2/2016 |
| WO | 2016/103711 | 6/2016 |
| WO | 2016/104418 | 6/2016 |
| WO | 2016/117443 | 7/2016 |
| WO | 2016/157538 | 10/2016 |
| WO | 2016/182030 | 11/2016 |
| WO | 2016/190232 | 12/2016 |
| WO | 2017/038489 | 3/2017 |
| WO | 2017/056789 | 4/2017 |
| WO | 2017/057004 | 4/2017 |
| WO | 2017/115636 | 7/2017 |
| WO | 2017/122517 | 7/2017 |
| WO | 2017/195248 | 11/2017 |
| WO | 2019/123782 | 6/2019 |
| WO | 2019/123804 | 6/2019 |
| WO | 2019/123805 | 6/2019 |
| WO | 2019/123806 | 6/2019 |
| WO | 2019/123807 | 6/2019 |
| WO | 2019/124400 | 6/2019 |
| WO | 2019/124401 | 6/2019 |
| WO | 2019/124402 | 6/2019 |
| WO | 2019/124403 | 6/2019 |
| WO | 2019/124404 | 6/2019 |

OTHER PUBLICATIONS

International Search Report dated Mar. 12, 2019 in International (PCT) Application No. PCT/JP2018/046642.
International Search Report dated Dec. 18, 2018 in International (PCT) Application No. PCT/JP2018/038746.
International Search Report dated Mar. 19, 2019 in International (PCT) Application No. PCT/JP2018/046643.
International Search Report dated Dec. 18, 2018 in International (PCT) Application No. PCT/JP2018/038748.
International Search Report dated Mar. 12, 2019 in International (PCT) Application No. PCT/JP2018/046640.
International Search Report dated Mar. 19, 2019 in International (PCT) Application No. PCT/JP2018/046644.
International Search Report dated Dec. 18, 2018 in International (PCT) Application No. PCT/JP2018/038749.

(56) References Cited

OTHER PUBLICATIONS

International Search Report dated Dec. 18, 2018 in International (PCT) Application No. PCT/JP2018/037483.
International Search Report dated Dec. 18, 2018 in International (PCT) Application No. PCT/JP2018/038747.
International Preliminary Report on Patentability dated Jun. 23, 2020 in International Application No. PCT/JP2018/045978.
International Search Report dated Mar. 19, 2019 in International Application No. PCT/JP2018/045978.
International Preliminary Report on Patentability dated Jun. 23, 2020 in International Application No. PCT/JP2018/046532.
International Search Report dated Feb. 12, 2019 in International Application No. PCT/JP2018/046532.
International Preliminary Report on Patentability dated Jun. 23, 2020 in International Application No. PCT/JP2018/042027.
International Search Report dated Feb. 12, 2019 in International Application No. PCT/JP2018/042027.
International Preliminary Report on Patentability dated Jun. 23, 2020 in International Application No. PCT/JP2018/042032.
International Search Report dated Feb. 19, 2019 in International Application No. PCT/JP2018/042032.
International Preliminary Report on Patentability dated Jun. 23, 2020 in International Application No. PCT/JP2018/046666.
International Search Report dated Apr. 2, 2019 in International Application No. PCT/JP2018/046666.
International Preliminary Report on Patentability dated Jun. 23, 2020 in International Application No. PCT/JP2018/045336.
International Search Report dated Feb. 19, 2019 in International Application No. PCT/JP2018/045336.
International Preliminary Report on Patentability dated Jun. 23, 2020 in International Application No. PCT/JP2018/045557.
International Search Report dated Mar. 12, 2019 in International Application No. PCT/JP2018/045557.
International Preliminary Report on Patentability dated Jun. 23, 2020 in International Application No. PCT/JP2018/046426.
International Search Report dated Feb. 19, 2019 in International Application No. PCT/JP2018/046426.
International Preliminary Report on Patentability dated Jun. 23, 2020 in International Application No. PCT/JP2018/046427.
International Search Report dated Feb. 19, 2019 in International Application No. PCT/JP2018/046427.
International Preliminary Report on Patentability dated Jun. 23, 2020 in International Application No. PCT/JP2018/046428.
International Search Report dated Mar. 19, 2019 in International Application No. PCT/JP2018/046428.
International Preliminary Report on Patentability dated Jun. 23, 2020 in International Application No. PCT/JP2018/046581.
International Search Report dated Mar. 5, 2019 in International Application No. PCT/JP2018/046581.
International Preliminary Report on Patentability dated Jun. 23, 2020 in International Application No. PCT/JP2018/046630.
International Search Report dated Mar. 5, 2019 in International Application No. PCT/JP2018/046630.
International Preliminary Report on Patentability dated Jun. 23, 2020 in International Application No. PCT/JP2018/046582.
International Search Report dated Mar. 5, 2019 in International Application No. PCT/JP2018/046582.
International Preliminary Report on Patentability dated Jun. 23, 2020 in International Application No. PCT/JP2018/046631.
International Search Report dated Mar. 5, 2019 in International Application No. PCT/JP2018/046631.
International Preliminary Report on Patentability dated Jun. 23, 2020 in International Application No. PCT/JP2018/046627.
International Search Report dated Mar. 19, 2019 in International Application No. PCT/JP2018/046627.
International Preliminary Report on Patentability dated Jun. 23, 2020 in International Application No. PCT/JP2018/046628.
International Search Report dated Mar. 19, 2019 in International Application No. PCT/JP2018/046628.
International Preliminary Report on Patentability dated Jun. 23, 2020 in International Application No. PCT/JP2018/045979.
International Search Report dated Mar. 12, 2019 in International Application No. PCT/JP2018/045979.
International Preliminary Report on Patentability dated Jun. 23, 2020 in International Application No. PCT/JP2018/046434.
International Search Report dated Feb. 19, 2019 in International Application No. PCT/JP2018/046434.
International Preliminary Report on Patentability dated Jun. 23, 2020 in International Application No. PCT/JP2018/045290.
International Search Report dated Jan. 22, 2019 in International Application No. PCT/JP2018/045290.
International Preliminary Report on Patentability dated Jun. 23, 2020 in International Application No. PCT/JP2018/045288.
International Search Report dated Jan. 22, 2019 in International Application No. PCT/JP2018/045288.
International Preliminary Report on Patentability dated Jun. 23, 2020 in International Application No. PCT/JP2018/045289.
International Search Report dated Jan. 22, 2019 in International Application No. PCT/JP2018/045289.
International Preliminary Report on Patentability dated Jun. 23, 2020 in International Application No. PCT/JP2018/046639.
International Preliminary Report on Patentability dated Jun. 23, 2020 in International Application No. PCT/JP2018/046642.
International Preliminary Report on Patentability dated Jun. 23, 2020 in International Application No. PCT/JP2018/038746.
International Preliminary Report on Patentability dated Jun. 23, 2020 in International Application No. PCT/JP2018/046643.
International Preliminary Report on Patentability dated Jun. 23, 2020 in International Application No. PCT/JP2018/038748.
International Preliminary Report on Patentability dated Jun. 23, 2020 in International Application No. PCT/JP2018/046640.
International Preliminary Report on Patentability dated Jun. 23, 2020 in International Application No. PCT/JP2018/046644.
International Preliminary Report on Patentability dated Jun. 23, 2020 in International Application No. PCT/JP2018/038749.
International Preliminary Report on Patentability dated Jun. 23, 2020 in International Application No. PCT/JP2018/037483.
International Search Report dated Feb. 19, 2019 in International Application No. PCT/JP2018/045335.
International Preliminary Report on Patentability dated Jun. 23, 2020 in International Application No. PCT/JP2018/045335.
International Search Report dated Feb. 19, 2019 in International Application No. PCT/JP2018/046435.
International Preliminary Report on Patentability dated Jun. 23, 2020 in International Application No. PCT/JP2018/046435.
International Search Report dated Mar. 19, 2019 in International (PCT) Application No. PCT/JP2018/046530.
International Preliminary Report on Patentability dated Jun. 23, 2020 in International Application No. PCT/JP2018/046530.
International Search Report dated Feb. 12, 2019 in International (PCT) Application No. PCT/JP2018/046533.
International Preliminary Report on Patentability dated Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability dated Jun. 23, 2020 in International Application No. PCT/JP2018/038747.
International Search Report dated Mar. 19, 2019 in International Application No. PCT/JP2018/046531.
International Preliminary Report on Patentability dated Jun. 23, 2020 in International Application No. PCT/JP2018/046531.
Summary, Collection of Papers of the 2nd Symposium on New Technologies of Refrigeration and Air Conditioning, 2nd Edition, Ding Guoliang, Ed., published by Shanghai Jiatong University Press, 2003, with Concise Explanation.

* cited by examiner

COMPOSITION COMPRISING REFRIGERANT, USE THEREOF, REFRIGERATING MACHINE HAVING SAME, AND METHOD FOR OPERATING SAID REFRIGERATING MACHINE

TECHNICAL FIELD

The present disclosure relates to a composition comprising a refrigerant, use of the composition, a refrigerating machine having the composition, and a method for operating the refrigerating machine.

BACKGROUND ART

R410A is currently used as an air conditioning refrigerant for home air conditioners etc. R410A is a two-component mixed refrigerant of difluoromethane ($CH_2F_2$:HFC-32 or R32) and pentafluoroethane ($C_2HF_5$:HFC-125 or R125), and is a pseudo-azeotropic composition.

However, the global warming potential (GWP) of R410A is 2088. Due to growing concerns about global warming, R32, which has a GWP of 675, has been increasingly used.

For this reason, various low-GWP mixed refrigerants that can replace R410A have been proposed (PTL 1).

CITATION LIST

Patent Literature

PTL 1: WO2015/141678

SUMMARY OF INVENTION

Technical Problem

The present inventors performed independent examination, and conceived of the idea that no prior art had developed refrigerant compositions having three types of performance, i.e., a refrigerating capacity (also referred to as "cooling capacity" or "capacity") and a coefficient of performance (COP) that are equivalent to those of R410A, and a sufficiently low GWP. An object of the present disclosure is to solve this unique problem.

Solution to Problem

Item 1
A composition comprising a refrigerant, the refrigerant comprising trans-1,2-difluoroethylene (HFO-1132(E)), trifluoroethylene (HFO-1123), and 2,3,3,3-tetrafluoro-1-propene (R1234yf).
Item 2
The composition according to Item 1,
wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segments BD, CO, and OA);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.
Item 3
The composition according to Item 1,
wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments IA, BD, and CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.
Item 4
The composition according to Item 1,
wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);

the line segment PN is represented by coordinates (x, $-0.1135x^2+12.112x-280.43$, $0.1135x^2-13.112x+380.43$), the line segment NK is represented by coordinates (x, $0.2421x^2-29.955x+931.91$, $-0.2421x^2+28.955x-831.91$), the line segment KA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, BD, and CJ are straight lines.

Item 5

The composition according to Item 1, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PL, LM, A'B, BD, DC', C'C, and CJ that connect the following 9 points:

point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0), or on the above line segments (excluding the points on the line segments BD and CJ);

the line segment PL is represented by coordinates (x, $-0.1135x^2+12.112x-280.43$, $0.1135x^2-13.112x+380.43$)

the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, LM, BD, and CJ are straight lines.

Item 6

The composition according to Item 1, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:

point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3), or on the above line segments (excluding the points on the line segment BF);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TP is represented by coordinates (x, $0.00672x^2-0.7607x+63.525$, $-0.00672x^2-0.2393x+36.475$), and the line segments LM and BF are straight lines.

Item 7

The composition according to Item 1, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:

point P (55.8, 42.0, 2.2),
point L (63.1, 31.9, 5.0),
point Q (62.8, 29.6, 7.6), and
point R (49.8, 42.3, 7.9), or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

Item 8

The composition according to Item 1, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3), or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $0.0017x^2-0.7869x+70.888$, $-0.0017x^2-0.2131x+29.112$), and the line segments SM and BF are straight lines.

Item 9

A composition comprising a refrigerant, the refrigerant comprising HFO-1132(E) and R1234yf, and optionally further comprising HFO-1123, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments Od, dg, gh, and hO that connect the following 4 points:
point d (87.6, 0.0, 12.4),
point g (18.2, 55.1, 26.7),
point h (56.7, 43.3, 0.0), and
point O (100.0, 0.0, 0.0),
or on the line segments Od, dg, and gh (excluding the points O and h);
the line segment dg is represented by coordinates $(0.0047y^2-1.5177y+87.598, y, -0.0047y^2+0.5177y+12.402)$,
the line segment gh is represented by coordinates $(-0.0134z^2-1.0825z+56.692, 0.0134z^2+0.0825z+43.308, z)$, and the line segments HO and OD are straight lines.
Item 10
The composition according to Item 1,
wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments lg, gh, hi, and il that connect the following 4 points:
point l (72.5, 10.2, 17.3),
point g (18.2, 55.1, 26.7),
point h (56.7, 43.3, 0.0), and
point i (72.5, 27.5, 0.0) or
on the line segments lg, gh, and il (excluding the points h and i);
the line segment lg is represented by coordinates $(0.0047y^2-1.5177y+87.598, y, 31\ 0.0047y^2+0.5177y+12.402)$,
the line segment gh is represented by coordinates $(-0.0134z^2-1.0825z+56.692, 0.0134z^2+0.0825z+43.308, z)$, and
the line segments hi and il are straight lines.
Item 11
The composition according to any one of Items 1 to 10, for use as a working fluid for a refrigerating machine, wherein the composition further comprises a refrigeration oil.
Item 12
The composition according to any one of Items 1 to 11, for use as an alternative refrigerant for R410A.
Item 13
Use of the composition according to any one of Items 1 to 11 as an alternative refrigerant for R410A.
Item 14
A refrigerating machine comprising the composition according to any one of Items 1 to 11 as a working fluid.
Item 15
A method for operating a refrigerating machine, comprising the step of circulating the composition according to any one of Items 1 to 11 as a working fluid in a refrigerating machine.

Advantageous Effects of Invention

The refrigerant according to the present disclosure has three types of performance, i.e., a refrigerating capacity and a coefficient of performance that are equivalent to those of R410A, and a sufficiently low GWP.

DESCRIPTION OF EMBODIMENTS

Figure 1:
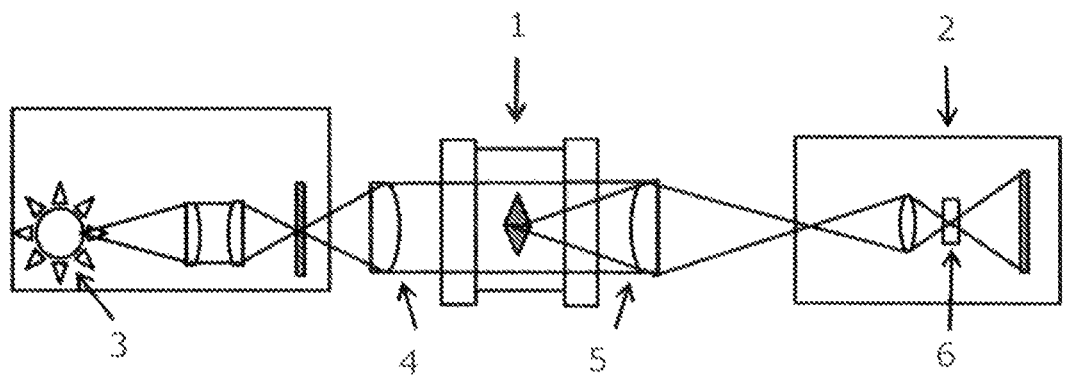
FIG. 1 is a schematic view of an apparatus used in a flammability test.
Figure 2:
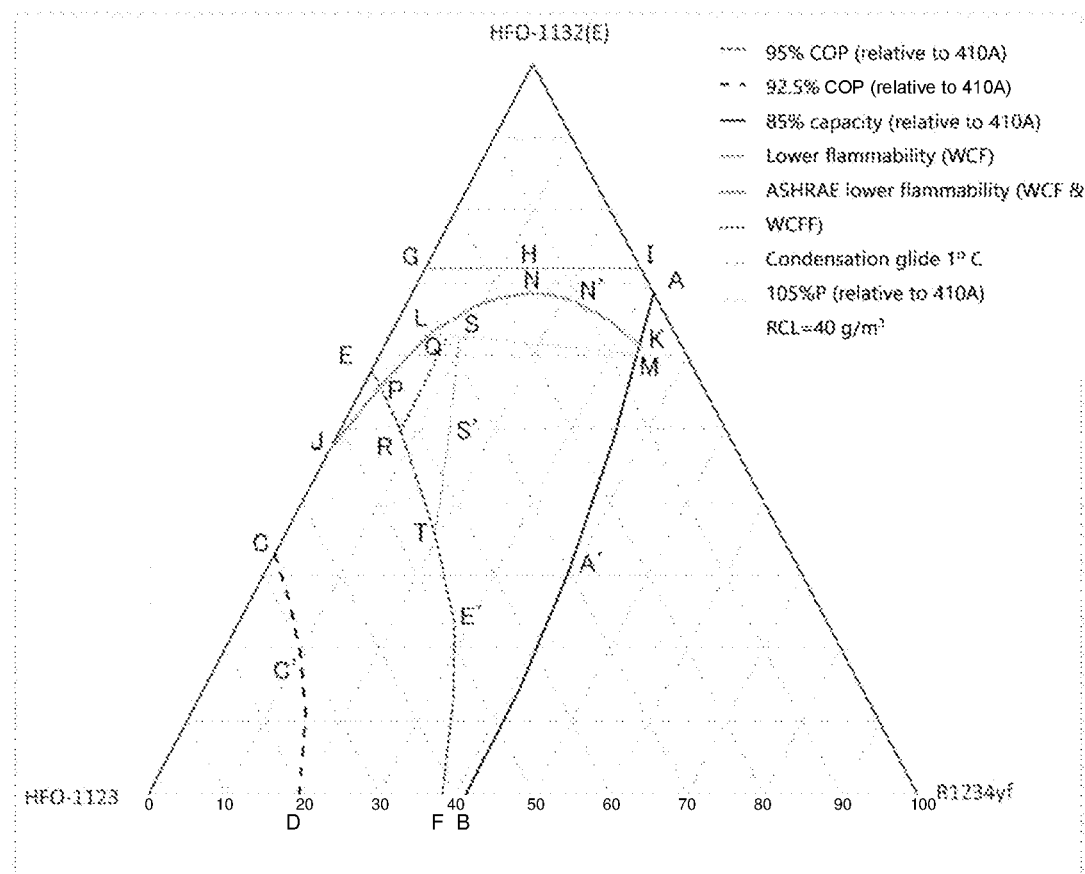
FIG. 2 is a diagram showing points A to T and line segments that connect these points in a ternary composition diagram in which the sum of HFO-1132(E), HFO-1123, and R1234yf is 100 mass %.

The present inventors conducted intensive study to solve the above problem, and consequently found that a mixed refrigerant comprising trans-1,2-difluoroethylene (HFO-1132(E)), trifluoroethylene (HFO-1123), and 2,3,3,3-tetrafluoro-1-propene (R1234yf) has the above properties.
The present disclosure has been completed as a result of further research based on this finding. The present disclosure includes the following embodiments.
Definition of Terms
In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in tams of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.
In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."
In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to classified as be "Class 2L."

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

In the present specification, temperature glide refers to an absolute value of the difference between the initial temperature and the end temperature in the phase change process of a composition containing the refrigerant of the present disclosure in the heat exchanger of a refrigerant system.

1. Refrigerant
1.1 Refrigerant Component

The refrigerant according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant according to the present disclosure has various properties that are desirable as an R410A-alternative refrigerant, i.e., a refrigerating capacity and a coefficient of performance that are equivalent to those of R410A, and a sufficiently low GWP.

The refrigerant according to the present disclosure is a composition comprising HFO-1132(E) and R1234yf, and optionally further comprising HFO-1123, and may further satisfy the following requirements. This refrigerant also has various properties desirable as an alternative refrigerant for R410A; i.e., it has a refrigerating capacity and a coefficient of performance that are equivalent to those of R410A, and a sufficiently low GWP.

Requirements

When the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line CO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$,
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.

When the requirements above are satisfied, the refrigerant according to the present disclosure has a refrigerating capacity ratio of 85% or more relative to that of R410A, and a COP of 92.5% or more relative to that of R410A.

When the mass % of HFO-1132(E), HFO-1123, and R1234yf, based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant has a WCF lower flammability according to the ASHRAE Standard (the WCF composition has a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CJ);
the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, BD, and CJ are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant exhibits a lower flammability (Class 2L) according to the ASHRAE Standard (the WCF composition and the WCFF composition have a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point (32.9, 67.1, 0.0),
or on the above line segments (excluding the points on the line segment CJ);
the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.008^2x2-0.3329x+19.6$),
the line segment C'C is represented by coordinates (x, $0.0067x^2-0.6034x+79.729$, $-0.0067x^2-0.3966x+20.271$), and
the line segments JP, LM, BD, and CJ are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant has an RCL of 40 g/m$^3$ or more.

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);
the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$),
the line segment TP is represented by coordinates (x, $0.00672x^2-0.7607x+63.525$, $-0.00672x^2-0.2393x+36.475$), and
the line segments LM and BF are straight lines.

When the requirements above are satisfied, the refrigerant according to the present disclosure has a refrigerating capacity ratio of 85% or more relative to that of R410A, and a COP of 95% or more relative to that of R410A; furthermore, the refrigerant has an RCL of 40 g/m$^3$ or more.

The refrigerant according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:
point P (55.8, 42.0, 2.2),
point L (63.1, 31.9, 5.0),
point Q (62.8, 29.6, 7.6), and
point R (49.8, 42.3, 7.9),
or on the above line segments;
the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

When the requirements above are satisfied, the refrigerant according to the present disclosure has a COP of 95% or more relative to that of R410A, and an RCL of 40 g/m³ or more; furthermore, the refrigerant has a condensation temperature glide of 1° C. or less.

The refrigerant according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $0.0017x^2-0.7869x+70.888$, $-0.0017x^2-0.2131x+29.112$), and the line segments SM and BF are straight lines.

When the requirements above are satisfied, the refrigerant according to the present disclosure has a refrigerating capacity ratio of 85% or more relative to that of R410A, a COP of 95% or more relative to that of R410A, and an RCL of 40 g/m³ or more; furthermore, the refrigerant has a discharge pressure of 105% or more relative to that of R410A.

The refrigerant according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments Od, dg, gh, and hO that connect the following 4 points:

point d (87.6, 0.0, 12.4),
point g (18.2, 55.1, 26.7),
point h (56.7, 43.3, 0.0), and
point o (100.0, 0.0, 0.0),
or on the line segments Od, dg, gh, and hO (excluding the points O and h);

the line segment dg is represented by coordinates $(0.0047y^2-1.5177y+87.598$, y, $-0.0047y^2+0.5177y+12.402)$, the line segment gh is represented by coordinates $(-0.0134z^2-1.0825z+56.692$, $0.0134z^2+0.0825z+43.308$, z), and the line segments hO and Od are straight lines.

When the requirements above are satisfied, the refrigerant according to the present disclosure has a refrigerating capacity ratio of 92.5% or more relative to that of R410A, and a COP ratio of 92.5% or more relative to that of R410A.

The refrigerant according to the present disclosure is preferably a refrigerant wherein when the mass % of HFO-1132(E), HFO-1123, and R1234yf, based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments lg, gh, hi, and il that connect the following 4 points:

point l (72.5, 10.2, 17.3),
point g (18.2, 55.1, 26.7),
point h (56.7, 43.3, 0.0), and
point i (72.5, 27.5, 0.0) or
on the line segments lg, gh, and il (excluding the points h and i);

the line segment lg is represented by coordinates $(0.0047y^2-1.5177y+87.598$, y, $-0.0047y^2+0.5177y+12.402)$, the line gh is represented by coordinates $(-0.0134z^2-1.0825z+56.692$, $0.0134z^2+0.0825z+43.308$, z), and the line segments hi and il are straight lines.

When the requirements above are satisfied, the refrigerant according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE Standard.

The refrigerant according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Od, de, ef, and fO that connect the following 4 points:

point d (87.6, 0.0, 12.4),
point e (31.1, 42.9, 26.0),
point f (65.5, 34.5, 0.0), and
point O (100.0, 0.0, 0.0),
or on the line segments Od, de, and ef (excluding the points O and f);

the line segment de is represented by coordinates $(0.0047y^2-1.5177y+87.598$, y, $-0.0047y^2+0.5177y+12.402)$, the line segment ef is represented by coordinates $(-0.0064z^2-1.1565z+65.501$, $0.0064z^2+0.1565z+34.499$, z), and the line segments fO and Od are straight lines.

When the requirements above are satisfied, the refrigerant according to the present disclosure has a refrigerating capacity ratio of 93.5% or more relative to that of R410A, and a COP ratio of 93.5% or more relative to that of R410A.

The refrigerant according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments le, ef, fi, and il that connect the following 4 points:

point l (72.5, 10.2, 17.3),
point e (31.1, 42.9, 26.0),
point f (65.5, 34.5, 0.0), and
point i (72.5, 27.5, 0.0), or on the line segments le, ef, and il (excluding the points f and i);

the line segment le is represented by coordinates ($0.0047y^2-1.5177y+87.598$, y, $-0.0047y^2+0.5177y+12.402$), the line segment ef is represented by coordinates ($-0.0134z^2-1.0825z+56.692$, $0.0134z^2+0.0825z+43.308$, z), and the line segments fi and il are straight lines.

When the requirements above are satisfied, the refrigerant according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE Standard.

The refrigerant according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Oa, ab, bc, and cO that connect the following 4 points:

point a (93.4, 0.0, 6.6),
point b (55.6, 26.6, 17.8),
point c (77.6, 22.4, 0.0), and
point O (100.0, 0.0, 0.0),
or on the line segments Oa, ab, and bc (excluding the points O and c);

the line segment ab is represented by coordinates ($0.0052y^2-1.5588y+93.385$, y, $-0.0052y^2+0.5588y+6.615$), the line segment bc is represented by coordinates ($-0.0032z^2-1.1791z+77.593$, $0.0032z^2+0.1791z+22.407$, z), and the line segments cO and Oa are straight lines.

When the requirements above are satisfied, the refrigerant according to the present disclosure has a refrigerating capacity ratio of 95% or more relative to that of R410A, and a COP ratio of 95% or more relative to that of R410A.

The refrigerant according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments kb, bj, and jk that connect the following 3 points:

point k (72.5, 14.1, 13.4),
point b (55.6, 26.6, 17.8), and
point j (72.5, 23.2, 4.3),
or on the line segments kb, bj, and jk;

the line segment kb is represented by coordinates ($0.0052y^2-1.5588y+93.385$, y, and $-0.0052y^2+0.5588y+6.615$), the line segment bj is represented by coordinates ($-0.0032z^2-1.1791z+77.593$, $0.0032z^2+0.1791z+22.407$, z), and the line segment jk is a straight line.

When the requirements above are satisfied, the refrigerant according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE Standard.

The refrigerant according to the present disclosure may further comprise other additional refrigerants in addition to HFO-1132(E), HFO-1123, and R1234yf, as long as the above properties and effects are not impaired. In this respect, the refrigerant according to the present disclosure preferably comprises HFO-1132(E), HFO-1123, and R1234yf in a total amount of 99.5 mass % or more, more preferably 99.75 mass % or more, and still more preferably 99.9 mass % or more, based on the entire refrigerant.

The refrigerant according to the present disclosure may comprise HFO-1132(E), HFO-1123, and R1234yf in a total amount of 99.5 mass % or more, 99.75 mass % or more, or 99.9 mass % or more, based on the entire refrigerant.

Additional refrigerants are not particularly limited and can be widely selected. The mixed refrigerant may contain one additional refrigerant, or two or more additional refrigerants.

1.2. Use

The refrigerant according to the present disclosure can be preferably used as a working fluid in a refrigerating machine.

The composition according to the present disclosure is suitable for use as an alternative refrigerant for R410A.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil.

Specifically, in the refrigerant composition according to the present disclosure, the content of the refrigeration oil based on the entire refrigerant composition is preferably 0 to 1 mass %, and more preferably 0 to 0.1 mass %.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferable as the tracer.
FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may contain one or more tracers at a total concentration of about 10 parts per million by weight (ppm) to about 1000 ppm based on the entire refrigerant composition. The refrigerant composition according to the present disclosure may preferably contain one or more tracers at a total concentration of about 30 ppm to about 500 ppm, and more preferably about 50 ppm to about 300 ppm, based on the entire refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

3.1. Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

3.2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises the step of circulating the refrigerant according to the present disclosure in a refrigerating machine.

The embodiments are described above; however, it will be understood that various changes in forms and details can be made without departing from the spirit and scope of the claims.

EXAMPLES

The present disclosure is described in more detail below with reference to Examples. However, the present disclosure is not limited to the Examples.

The GWP of R1234yf and a composition consisting of a mixed refrigerant R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in PTL 1). The refrigerating capacity of R410A and compositions each comprising a mixture of HFO-1132(E), HFO-1123, and R1234yf was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Further, the RCL of the mixture was calculated with the LFL of HFO-1132(E) being 4.7 vol. %, the LFL of HFO-1123 being 10 vol. %, and the LFL of R1234yf being 6.2 vol. %, in accordance with the ASHRAE Standard 34-2013.

Evaporating temperature: 5° C.
Condensation temperature: 45° C.
Degree of superheating: 5 K
Degree of subcooling: 5 K
Compressor efficiency: 70%

Tables 1 to 34 show these values together with the GWP of each mixed refrigerant.

TABLE 1

| Item | Unit | Comp. Ex. 1 | Comp. Ex. 2 O | Comp. Ex. 3 A | Example 1 | Example 2 A' | Example 3 | Comp. Ex. 4 B |
|---|---|---|---|---|---|---|---|---|
| HFO-1132(E) | mass % | R410A | 100.0 | 68.6 | 49.0 | 30.6 | 14.1 | 0.0 |
| HFO-1123 | mass % | | 0.0 | 0.0 | 14.9 | 30.0 | 44.8 | 58.7 |
| R1234yf | mass % | | 0.0 | 31.4 | 36.1 | 39.4 | 41.1 | 41.3 |
| GWP | — | 2088 | 1 | 2 | 2 | 2 | 2 | 2 |
| COP ratio | % (relative to 410A) | 100 | 99.7 | 100.0 | 98.6 | 97.3 | 96.3 | 95.5 |
| Refrigerating capacity ratio | % (relative to 410A) | 100 | 98.3 | 85.0 | 85.0 | 85.0 | 85.0 | 85.0 |
| Condensation glide | ° C. | 0.1 | 0.00 | 1.98 | 3.36 | 4.46 | 5.15 | 5.35 |
| Discharge pressure | % (relative to 410A) | 100.0 | 99.3 | 87.1 | 88.9 | 90.6 | 92.1 | 93.2 |
| RCL | g/m³ | — | 30.7 | 37.5 | 44.0 | 52.7 | 64.0 | 78.6 |

TABLE 2

| Item | Unit | Comp. Ex. 5 C | Example 4 | Example 5 C' | Example 6 | Comp. Ex. 6 D | Comp. Ex. 7 E | Example 7 E' | Comp. Ex. 8 F |
|---|---|---|---|---|---|---|---|---|---|
| HFO-1132(E) | mass % | 32.9 | 26.6 | 19.5 | 10.9 | 0.0 | 58.0 | 23.4 | 0.0 |
| HFO-1123 | mass % | 67.1 | 68.4 | 70.5 | 74.1 | 80.4 | 42.0 | 48.5 | 61.8 |
| R1234yf | mass % | 0.0 | 5.0 | 10.0 | 15.0 | 19.6 | 0.0 | 28.1 | 38.2 |
| GWP | — | 1 | 1 | 1 | 1 | 2 | 1 | 2 | 2 |
| COP ratio | % (relative to 410A) | 92.5 | 92.5 | 92.5 | 92.5 | 92.5 | 95.0 | 95.0 | 95.0 |
| Refrigerating capacity ratio | % (relative to 410A) | 107.4 | 105.2 | 102.9 | 100.5 | 97.9 | 105.0 | 92.5 | 86.9 |
| Condensation glide | ° C. | 0.16 | 0.52 | 0.94 | 1.42 | 1.90 | 0.42 | 3.16 | 4.80 |
| Discharge pressure | % (relative to 410A) | 119.5 | 117.4 | 115.3 | 113.0 | 115.9 | 112.7 | 101.0 | 95.8 |
| RCL | g/m³ | 53.5 | 57.1 | 62.0 | 69.1 | 81.3 | 41.9 | 46.3 | 79.0 |

TABLE 3

| Item | Unit | Comp. Ex. 9 J | Example 8 P | Example 9 L | Example 10 N | Example 11 N' | Example 12 K |
|---|---|---|---|---|---|---|---|
| HFO-1132(E) | mass % | 47.1 | 55.8 | 63.1 | 68.6 | 65.0 | 61.3 |
| HFO-1123 | mass % | 52.9 | 42.0 | 31.9 | 16.3 | 7.7 | 5.4 |
| R1234yf | mass % | 0.0 | 2.2 | 5.0 | 15.1 | 27.3 | 33.3 |
| GWP | — | 1 | 1 | 1 | 1 | 2 | 2 |
| COP ratio | % (relative to 410A) | 93.8 | 95.0 | 96.1 | 97.9 | 99.1 | 99.5 |
| Refrigerating capacity ratio | % (relative to 410A) | 106.2 | 104.1 | 101.6 | 95.0 | 88.2 | 85.0 |
| Condensation glide | ° C. | 0.31 | 0.57 | 0.81 | 1.41 | 2.11 | 2.51 |
| Discharge pressure | % (relative to 410A) | 115.8 | 111.9 | 107.8 | 99.0 | 91.2 | 87.7 |
| RCL | g/m³ | 46.2 | 42.6 | 40.0 | 38.0 | 38.7 | 39.7 |

TABLE 4

| Item | Unit | Example 13 L | Example 14 M | Example 15 Q | Example 16 R | Example 17 S | Example 18 S' | Example 19 T |
|---|---|---|---|---|---|---|---|---|
| HFO-1132(E) | mass % | 63.1 | 60.3 | 62.8 | 49.8 | 62.6 | 50.0 | 35.8 |
| HFO-1123 | mass % | 31.9 | 6.2 | 29.6 | 42.3 | 28.3 | 35.8 | 44.9 |
| R1234yf | mass % | 5.0 | 33.5 | 7.6 | 7.9 | 9.1 | 14.2 | 19.3 |
| GWP | — | 1 | 2 | 1 | 1 | 1 | 1 | 2 |
| COP ratio | % (relative to 410A) | 96.1 | 99.4 | 96.4 | 95.0 | 96.6 | 95.8 | 95.0 |
| Refrigerating capacity ratio | % (relative to 410A) | 101.6 | 85.0 | 100.2 | 101.7 | 99.4 | 98.1 | 96.7 |
| Condensation glide | ° C. | 0.81 | 2.58 | 1.00 | 1.00 | 1.10 | 1.55 | 2.07 |
| Discharge pressure | % (relative to 410A) | 107.8 | 87.9 | 106.0 | 109.6 | 105.0 | 105.0 | 105.0 |
| RCL | g/m³ | 40.0 | 40.0 | 40.0 | 44.8 | 40.0 | 44.4 | 50.8 |

TABLE 5

| Item | Unit | Comp. Ex. 10 G | Example 20 H | Example 21 I |
|---|---|---|---|---|
| HFO-1132(E) | mass % | 72.0 | 72.0 | 72.0 |
| HFO-1123 | mass % | 28.0 | 14.0 | 0.0 |
| R1234yf | mass % | 0.0 | 14.0 | 28.0 |
| GWP | — | 1 | 1 | 2 |
| COP ratio | % (relative to 410A) | 96.6 | 982 | 99.9 |
| Refrigerating capacity ratio | % (relative to 410A) | 103.1 | 95.1 | 86.6 |
| Condensation glide | ° C. | 0.46 | 127 | 1.71 |
| Discharge pressure | % (relative to 410A) | 108.4 | 98.7 | 88.6 |
| RCL | g/m³ | 37.4 | 37.0 | 36.6 |

TABLE 6

| Item | Unit | Comp. Ex. 11 | Comp. Ex. 12 | Example 22 | Example 23 | Example 24 | Example 25 | Example 26 | Comp. Ex. 13 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R1234yf | mass % | 5.0 | 5.0 | 5.0 | 5.0 | 5.0 | 5.0 | 5.0 | 5.0 |
| GWP | — | 1 | 1 | 1 | 1 | 1 | 1 | 1 | 1 |
| COP ratio | % (relative to 410A) | 91.4 | 92.0 | 92.8 | 93.7 | 94.7 | 95.8 | 96.9 | 980 |
| Refrigerating capacity ratio | % (relative to 410A) | 105.7 | 105.5 | 105.0 | 104.3 | 103.3 | 102.0 | 100.6 | 99.1 |
| Condensation glide | ° C. | 0.40 | 0.46 | 0.55 | 0.66 | 0.75 | 0.80 | 0.79 | 0.67 |
| Discharge pressure | % (relative to 410A) | 120.1 | 1187 | 116.7 | 114.3 | 111.6 | 108.7 | 105.6 | 102.5 |
| RCL | g/m³ | 71.0 | 61.9 | 54.9 | 49.3 | 44.8 | 41.0 | 37.8 | 35.1 |

TABLE 7

| Item | Unit | Comp. Ex. 14 | Example 27 | Example 28 | Example 29 | Example 30 | Example 31 | Example 32 | Comp. Ex. 15 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 80.0 | 70.0 | 60.0 | 50.0 | 40.0 | 30.0 | 20.0 | 10.0 |
| R1234yf | mass % | 10.0 | 10.0 | 10.0 | 10.0 | 10.0 | 10.0 | 10.0 | 10.0 |
| GWP | — | 1 | 1 | 1 | 1 | 1 | 1 | 1 | 1 |
| COP ratio | % (relative to 410A) | 91.9 | 92.5 | 93.3 | 94.3 | 95.3 | 96.4 | 97.5 | 98.6 |
| Refrigerating capacity ratio | % (relative to 410A) | 103.2 | 102.9 | 102.4 | 101.5 | 100.5 | 99.2 | 97.8 | 96.2 |
| Condensation glide | °C. | 0.87 | 0.94 | 1.03 | 1.12 | 1.18 | 1.18 | 1.09 | 0.88 |
| Discharge pressure | % (relative to 410A) | 116.7 | 115.2 | 113.2 | 110.8 | 108.1 | 105.2 | 102.1 | 99.0 |
| RCL | g/m$^3$ | 70.5 | 61.6 | 54.6 | 49.1 | 44.6 | 40.8 | 37.7 | 35.0 |

TABLE 8

| Item | Unit | Comp. Ex. 16 | Example 33 | Example 34 | Example 35 | Example 36 | Example 37 | Example 38 | Comp. Ex. 17 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 75.0 | 65.0 | 55.0 | 45.0 | 35.0 | 25.0 | 15.0 | 5.0 |
| R1234yf | mass % | 15.0 | 15.0 | 15.0 | 15.0 | 15.0 | 15.0 | 15.0 | 15.0 |
| GWP | — | 1 | 1 | 1 | 1 | 1 | 1 | 1 | 1 |
| COP ratio | % (relative to 410A) | 92.4 | 93.1 | 93.9 | 94.8 | 95.9 | 97.0 | 98.1 | 99.2 |
| Refrigerating capacity ratio | % (relative to 410A) | 100.5 | 100.2 | 99.6 | 987 | 97.7 | 96.4 | 94.9 | 93.2 |
| Condensation glide | °C. | 1.41 | 1.49 | 1.56 | 1.62 | 1.63 | 1.55 | 1.37 | 1.05 |
| Discharge pressure | % (relative to 410A) | 113.1 | 111.6 | 109.6 | 107.2 | 104.5 | 101.6 | 98.6 | 95.5 |
| RCL | g/m$^3$ | 70.0 | 61.2 | 54.4 | 48.9 | 44.4 | 40.7 | 37.5 | 34.8 |

TABLE 9

| Item | Unit | Example 39 | Example 40 | Example 41 | Example 42 | Example 43 | Example 44 | Example 45 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 70.0 | 60.0 | 50.0 | 40.0 | 30.0 | 20.0 | 10.0 |
| R1234yf | mass % | 20.0 | 20.0 | 20.0 | 20.0 | 20.0 | 20.0 | 20.0 |
| GWP | — | 2 | 2 | 2 | 2 | 2 | 2 | 2 |
| COP ratio | % (relative to 410A) | 93.0 | 93.7 | 94.5 | 95.5 | 96.5 | 97.6 | 98.7 |
| Refrigerating capacity ratio | % (relative to 410A) | 97.7 | 97.4 | 96.8 | 95.9 | 94.7 | 93.4 | 91.9 |
| Condensation glide | °C. | 2.03 | 2.09 | 2.13 | 2.14 | 2.07 | 1.91 | 1.61 |
| Discharge pressure | % (relative to 410A) | 109.4 | 107.9 | 105.9 | 103.5 | 100.8 | 980 | 95.0 |
| RCL | g/m$^3$ | 69.6 | 60.9 | 54.1 | 48.7 | 44.2 | 40.5 | 37.4 |

TABLE 10

| Item | Unit | Example 46 | Example 47 | Example 48 | Example 49 | Example 50 | Example 51 | Example 52 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 65.0 | 55.0 | 45.0 | 35.0 | 25.0 | 15.0 | 5.0 |
| R1234yf | mass % | 25.0 | 25.0 | 25.0 | 25.0 | 25.0 | 25.0 | 25.0 |
| GWP | — | 2 | 2 | 2 | 2 | 2 | 2 | 2 |
| COP ratio | % (relative to 410A) | 93.6 | 94.3 | 95.2 | 96.1 | 97.2 | 98.2 | 99.3 |
| Refrigerating capacity ratio | % (relative to 410A) | 94.8 | 94.5 | 93.8 | 92.9 | 91.8 | 90.4 | 88.8 |

TABLE 10-continued

| Item | Unit | Example 46 | Example 47 | Example 48 | Example 49 | Example 50 | Example 51 | Example 52 |
|---|---|---|---|---|---|---|---|---|
| Condensation glide | ° C. | 2.71 | 2.74 | 2.73 | 2.66 | 2.50 | 2.22 | 1.78 |
| Discharge pressure | % (relative to 410A) | 105.5 | 104.0 | 102.1 | 99.7 | 97.1 | 94.3 | 91.4 |
| RCL | g/m³ | 69.1 | 60.5 | 53.8 | 484 | 44.0 | 40.4 | 37.3 |

TABLE 11

| Item | Unit | Example 53 | Example 54 | Example 55 | Example 56 | Example 57 | Example 58 |
|---|---|---|---|---|---|---|---|
| HFO-1132(E) | mass % | 10.0 | 20.0 | 30.0 | 40.0 | 50.0 | 60.0 |
| HFO-1123 | mass % | 60.0 | 50.0 | 40.0 | 30.0 | 20.0 | 10.0 |
| R1234yf | mass % | 30.0 | 30.0 | 30.0 | 30.0 | 30.0 | 30.0 |
| GWP | — | 2 | 2 | 2 | 2 | 2 | 2 |
| COP ratio | % (relative to 410A) | 94.3 | 95.0 | 95.9 | 96.8 | 97.8 | 98.9 |
| Refrigerating capacity ratio | % (relative to 410A) | 91.9 | 91.5 | 90.8 | 89.9 | 88.7 | 87.3 |
| Condensation glide | ° C. | 3.46 | 3.43 | 3.35 | 3.18 | 2.90 | 2.47 |
| Discharge pressure | % (relative to 410A) | 101.6 | 100.1 | 98.2 | 95.9 | 93.3 | 90.6 |
| RCL | g/m³ | 68.7 | 60.2 | 53.5 | 48.2 | 43.9 | 40.2 |

TABLE 12

| Item | Unit | Example 59 | Example 60 | Example 61 | Example 62 | Example 63 | Comp. Ex. 18 |
|---|---|---|---|---|---|---|---|
| HFO-1132(E) | mass % | 10.0 | 20.0 | 30.0 | 40.0 | 50.0 | 60.0 |
| HFO-1123 | mass % | 55.0 | 45.0 | 35.0 | 25.0 | 15.0 | 5.0 |
| R1234yf | mass % | 35.0 | 35.0 | 35.0 | 35.0 | 35.0 | 35.0 |
| GWP | — | 2 | 2 | 2 | 2 | 2 | 2 |
| COP ratio | % (relative to 410A) | 95.0 | 95.8 | 96.6 | 97.5 | 98.5 | 99.6 |
| Refrigerating capacity ratio | % (relative to 410A) | 88.9 | 88.5 | 87.8 | 86.8 | 85.6 | 84.1 |
| Condensation glide | ° C. | 4.24 | 4.15 | 3.96 | 3.67 | 3.24 | 2.64 |
| Discharge pressure | % (relative to 410A) | 97.6 | 96.1 | 94.2 | 92.0 | 89.5 | 86.8 |
| RCL | g/m³ | 68.2 | 59.8 | 53.2 | 48.0 | 43.7 | 40.1 |

TABLE 13

| Item | Unit | Example 64 | Example 65 | Comp. Ex. 19 | Comp. Ex. 20 | Comp. Ex. 21 |
|---|---|---|---|---|---|---|
| HFO-1132(E) | mass % | 10.0 | 20.0 | 30.0 | 40.0 | 50.0 |
| HFO-1123 | mass % | 50.0 | 40.0 | 30.0 | 20.0 | 10.0 |
| R1234yf | mass % | 40.0 | 40.0 | 40.0 | 40.0 | 40.0 |
| GWP | — | 2 | 2 | 2 | 2 | 2 |
| COP ratio | % (relative to 410A) | 95.9 | 96.6 | 97.4 | 98.3 | 99.2 |
| Refrigerating capacity ratio | % (relative to 410A) | 85.8 | 85.4 | 84.7 | 83.6 | 82.4 |
| Condensation glide | ° C. | 5.05 | 4.85 | 4.55 | 4.10 | 3.50 |
| Discharge pressure | % (relative to 410A) | 93.5 | 92.1 | 90.3 | 88.1 | 85.6 |
| RCL | g/m³ | 67.8 | 59.5 | 53.0 | 47.8 | 43.5 |

TABLE 14

| Item | Unit | Example 66 | Example 67 | Example 68 | Example 69 | Example 70 | Example 71 | Example 72 | Example 73 |
|---|---|---|---|---|---|---|---|---|---|
| HFO-1132(E) | mass % | 54.0 | 56.0 | 580 | 62.0 | 52.0 | 54.0 | 56.0 | 580 |
| HFO-1123 | mass % | 41.0 | 39.0 | 37.0 | 33.0 | 41.0 | 39.0 | 37.0 | 35.0 |
| R1234yf | mass % | 5.0 | 5.0 | 5.0 | 5.0 | 7.0 | 7.0 | 7.0 | 7.0 |
| GWP | — | 1 | 1 | 1 | 1 | 1 | 1 | 1 | 1 |
| COP ratio | % (relative to 410A) | 95.1 | 95.3 | 95.6 | 96.0 | 95.1 | 95.4 | 95.6 | 95.8 |

TABLE 14-continued

| Item | Unit | Example 66 | Example 67 | Example 68 | Example 69 | Example 70 | Example 71 | Example 72 | Example 73 |
|---|---|---|---|---|---|---|---|---|---|
| Refrigerating capacity ratio | % (relative to 410A) | 102.8 | 102.6 | 102.3 | 101.8 | 101.9 | 101.7 | 101.5 | 101.2 |
| Condensation glide | ° C. | 0.78 | 0.79 | 0.80 | 0.81 | 0.93 | 0.94 | 0.95 | 0.95 |
| Discharge pressure | % (relative to 410A) | 110.5 | 109.9 | 109.3 | 108.1 | 109.7 | 109.1 | 108.5 | 107.9 |
| RCL | g/m$^3$ | 43.2 | 42.4 | 41.7 | 40.3 | 43.9 | 43.1 | 42.4 | 41.6 |

TABLE 15

| Item | Unit | Example 74 | Example 75 | Example 76 | Example 77 | Example 78 | Example 79 | Example 80 | Example 81 |
|---|---|---|---|---|---|---|---|---|---|
| HFO-1132(E) | mass % | 60.0 | 62.0 | 61.0 | 580 | 60.0 | 62.0 | 52.0 | 54.0 |
| HFO-1123 | mass % | 33.0 | 31.0 | 29.0 | 30.0 | 280 | 26.0 | 34.0 | 32.0 |
| R1234yf | mass % | 7.0 | 7.0 | 10.0 | 12.0 | 12.0 | 12.0 | 14.0 | 14.0 |
| GWP | — | 1 | 1 | 1 | 1 | 1 | 1 | 1 | 1 |
| COP ratio | % (relative to 410A) | 96.0 | 96.2 | 96.5 | 96.4 | 96.6 | 96.8 | 96.0 | 96.2 |
| Refrigerating capacity ratio | % (relative to 410A) | 100.9 | 100.7 | 99.1 | 98.4 | 98.1 | 97.8 | 980 | 97.7 |
| Condensation glide | ° C. | 0.95 | 0.95 | 1.18 | 1.34 | 1.33 | 1.32 | 1.53 | 1.53 |
| Discharge pressure | % (relative to 410A) | 107.3 | 106.7 | 104.9 | 104.4 | 103.8 | 103.2 | 104.7 | 104.1 |
| RCL | g/m$^3$ | 40.9 | 40.3 | 40.5 | 41.5 | 40.8 | 40.1 | 43.6 | 42.9 |

TABLE 16

| Item | Unit | Example 82 | Example 83 | Example 84 | Example 85 | Example 86 | Example 87 | Example 88 | Example 89 |
|---|---|---|---|---|---|---|---|---|---|
| HFO-1132(E) | mass % | 56.0 | 580 | 60.0 | 48.0 | 50.0 | 52.0 | 54.0 | 56.0 |
| HFO-1123 | mass % | 30.0 | 280 | 26.0 | 36.0 | 34.0 | 32.0 | 30.0 | 280 |
| R1234yf | mass % | 14.0 | 14.0 | 14.0 | 16.0 | 16.0 | 16.0 | 16.0 | 16.0 |
| GWP | — | 1 | 1 | 1 | 1 | 1 | 1 | 1 | 1 |
| COP ratio | % (relative to 410A) | 96.4 | 96.6 | 96.9 | 95.8 | 96.0 | 96.2 | 96.4 | 96.7 |
| Refrigerating capacity ratio | % (relative to 410A) | 97.5 | 97.2 | 96.9 | 97.3 | 97.1 | 96.8 | 96.6 | 96.3 |
| Condensation glide | ° C. | 1.51 | 1.50 | 1.48 | 1.72 | 1.72 | 1.71 | 1.69 | 1.67 |
| Discharge pressure | % (relative to 410A) | 103.5 | 102.9 | 102.3 | 104.3 | 103.8 | 103.2 | 102.7 | 102.1 |
| RCL | g/m$^3$ | 42.1 | 41.4 | 40.7 | 45.2 | 44.4 | 43.6 | 42.8 | 42.1 |

TABLE 17

| Item | Unit | Example 90 | Example 91 | Example 92 | Example 93 | Example 94 | Example 95 | Example 96 | Example 97 |
|---|---|---|---|---|---|---|---|---|---|
| HFO-1132(E) | mass % | 58.0 | 60.0 | 42.0 | 44.0 | 46.0 | 48.0 | 50.0 | 52.0 |
| HFO-1123 | mass % | 26.0 | 24.0 | 40.0 | 38.0 | 36.0 | 34.0 | 32.0 | 30.0 |
| R1234yf | mass % | 16.0 | 16.0 | 18.0 | 18.0 | 18.0 | 18.0 | 18.0 | 18.0 |
| GWP | — | 1 | 1 | 2 | 2 | 2 | 2 | 2 | 2 |
| COP ratio | % (relative to 410A) | 96.9 | 97.1 | 95.4 | 95.6 | 95.8 | 96.0 | 96.3 | 96.5 |
| Refrigerating capacity ratio | % (relative to 410A) | 96.1 | 95.8 | 96.8 | 96.6 | 96.4 | 96.2 | 95.9 | 95.7 |
| Condensation glide | ° C. | 1.65 | 1.63 | 1.93 | 1.92 | 1.92 | 1.91 | 1.89 | 1.88 |
| Discharge pressure | % (relative to 410A) | 101.5 | 100.9 | 104.5 | 103.9 | 103.4 | 102.9 | 102.3 | 101.8 |
| RCL | g/m$^3$ | 41.4 | 40.7 | 47.8 | 46.9 | 46.0 | 45.1 | 44.3 | 43.5 |

TABLE 18

| Item | Unit | Example 98 | Example 99 | Example 100 | Example 101 | Example 102 | Example 103 | Example 104 | Example 105 |
|---|---|---|---|---|---|---|---|---|---|
| HFO-1132(E) | mass % | 54.0 | 56.0 | 580 | 60.0 | 36.0 | 380 | 42.0 | 44.0 |
| HFO-1123 | mass % | 28.0 | 26.0 | 24.0 | 22.0 | 44.0 | 42.0 | 38.0 | 36.0 |
| R1234yf | mass % | 18.0 | 18.0 | 18.0 | 18.0 | 20.0 | 20.0 | 20.0 | 20.0 |
| GWP | — | 2 | 2 | 2 | 2 | 2 | 2 | 2 | 2 |
| COP ratio | % (relative to 410A) | 96.7 | 96.9 | 97.1 | 97.3 | 95.1 | 95.3 | 95.7 | 95.9 |
| Refrigerating capacity ratio | % (relative to 410A) | 95.4 | 95.2 | 94.9 | 94.6 | 96.3 | 96.1 | 95.7 | 95.4 |
| Condensation glide | ° C. | 1.86 | 1.83 | 1.80 | 1.77 | 2.14 | 2.14 | 2.13 | 2.12 |
| Discharge pressure | % (relative to 410A) | 101.2 | 100.6 | 100.0 | 99.5 | 104.5 | 104.0 | 103.0 | 102.5 |
| RCL | g/m$^3$ | 42.7 | 42.0 | 41.3 | 40.6 | 50.7 | 49.7 | 47.7 | 46.8 |

TABLE 19

| Item | Unit | Example 106 | Example 107 | Example 108 | Example 109 | Example 110 | Example 111 | Example 112 | Example 113 |
|---|---|---|---|---|---|---|---|---|---|
| HFO-1132(E) | mass % | 46.0 | 48.0 | 52.0 | 54.0 | 56.0 | 580 | 34.0 | 36.0 |
| HFO-1123 | mass % | 34.0 | 32.0 | 280 | 26.0 | 24.0 | 22.0 | 44.0 | 42.0 |
| R1234yf | mass % | 20.0 | 20.0 | 20.0 | 20.0 | 20.0 | 20.0 | 22.0 | 22.0 |
| GWP | — | 2 | 2 | 2 | 2 | 2 | 2 | 2 | 2 |
| COP ratio | % (relative to 410A) | 96.1 | 96.3 | 96.7 | 96.9 | 97.2 | 97.4 | 95.1 | 95.3 |
| Refrigerating capacity ratio | % (relative to 410A) | 95.2 | 95.0 | 94.5 | 94.2 | 94.0 | 93.7 | 95.3 | 95.1 |
| Condensation glide | ° C. | 2.11 | 2.09 | 2.05 | 2.02 | 1.99 | 1.95 | 2.37 | 2.36 |
| Discharge pressure | % (relative to 410A) | 101.9 | 101.4 | 100.3 | 99.7 | 99.2 | 98.6 | 103.4 | 103.0 |
| RCL | g/m$^3$ | 45.9 | 45.0 | 43.4 | 42.7 | 41.9 | 41.2 | 51.7 | 50.6 |

TABLE 20

| Item | Unit | Example 114 | Example 115 | Example 116 | Example 117 | Example 118 | Example 119 | Example 120 | Example 121 |
|---|---|---|---|---|---|---|---|---|---|
| HFO-1132(E) | mass % | 38.0 | 40.0 | 42.0 | 44.0 | 46.0 | 48.0 | 50.0 | 52.0 |
| HFO-1123 | mass % | 40.0 | 38.0 | 36.0 | 34.0 | 32.0 | 30.0 | 28.0 | 26.0 |
| R1234yf | mass % | 22.0 | 22.0 | 22.0 | 22.0 | 22.0 | 22.0 | 22.0 | 22.0 |
| GWP | — | 2 | 2 | 2 | 2 | 2 | 2 | 2 | 2 |
| COP ratio | % (relative to 410A) | 95.5 | 95.7 | 95.9 | 96.1 | 96.4 | 96.6 | 96.8 | 97.0 |
| Refrigerating capacity ratio | % (relative to 410A) | 94.9 | 94.7 | 94.5 | 94.3 | 94.0 | 93.8 | 93.6 | 93.3 |
| Condensation glide | ° C. | 2.36 | 2.35 | 2.33 | 2.32 | 2.30 | 2.27 | 2.25 | 2.21 |
| Discharge pressure | % (relative to 410A) | 102.5 | 102.0 | 101.5 | 101.0 | 100.4 | 99.9 | 99.4 | 98.8 |
| RCL | g/m$^3$ | 49.6 | 48.6 | 47.6 | 46.7 | 45.8 | 45.0 | 44.1 | 43.4 |

TABLE 21

| Item | Unit | Example 122 | Example 123 | Example 124 | Example 125 | Example 126 | Example 127 | Example 128 | Example 129 |
|---|---|---|---|---|---|---|---|---|---|
| HFO-1132(E) | mass % | 54.0 | 56.0 | 58.0 | 60.0 | 32.0 | 34.0 | 36.0 | 38.0 |
| HFO-1123 | mass % | 24.0 | 22.0 | 20.0 | 18.0 | 44.0 | 42.0 | 40.0 | 38.0 |
| R1234yf | mass % | 22.0 | 22.0 | 22.0 | 22.0 | 24.0 | 24.0 | 24.0 | 24.0 |
| GWP | — | 2 | 2 | 2 | 2 | 2 | 2 | 2 | 2 |
| COP ratio | % (relative to 410A) | 97.2 | 97.4 | 97.6 | 97.9 | 95.2 | 95.4 | 95.6 | 95.8 |

TABLE 21-continued

| Item | Unit | Example 122 | Example 123 | Example 124 | Example 125 | Example 126 | Example 127 | Example 128 | Example 129 |
|---|---|---|---|---|---|---|---|---|---|
| Refrigerating capacity ratio | % (relative to 410A) | 93.0 | 92.8 | 92.5 | 92.2 | 94.3 | 94.1 | 93.9 | 93.7 |
| Condensation glide | °C. | 2.18 | 2.14 | 2.09 | 2.04 | 2.61 | 2.60 | 2.59 | 2.58 |
| Discharge pressure | % (relative to 410A) | 98.2 | 97.7 | 97.1 | 96.5 | 102.4 | 101.9 | 101.5 | 101.0 |
| RCL | g/m³ | 42.6 | 41.9 | 41.2 | 40.5 | 52.7 | 51.6 | 50.5 | 49.5 |

TABLE 22

| Item | Unit | Example 130 | Example 131 | Example 132 | Example 133 | Example 134 | Example 135 | Example 136 | Example 137 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 36.0 | 34.0 | 32.0 | 30.0 | 28.0 | 26.0 | 24.0 | 22.0 |
| R1234yf | mass % | 24.0 | 24.0 | 24.0 | 24.0 | 24.0 | 24.0 | 24.0 | 24.0 |
| GWP | — | 2 | 2 | 2 | 2 | 2 | 2 | 2 | 2 |
| COP ratio | % (relative to 410A) | 96.0 | 96.2 | 96.4 | 96.6 | 96.8 | 97.0 | 97.2 | 97.5 |
| Refrigerating capacity ratio | % (relative to 410A) | 93.5 | 93.3 | 93.1 | 92.8 | 92.6 | 92.4 | 92.1 | 91.8 |
| Condensation glide | °C. | 2.56 | 2.54 | 2.51 | 2.49 | 2.45 | 2.42 | 2.38 | 2.33 |
| Discharge pressure | % (relative to 410A) | 100.5 | 100.0 | 99.5 | 98.9 | 98.4 | 97.9 | 97.3 | 96.8 |
| RCL | g/m³ | 48.5 | 47.5 | 46.6 | 45.7 | 44.9 | 44.1 | 43.3 | 42.5 |

TABLE 23

| Item | Unit | Example 138 | Example 139 | Example 140 | Example 141 | Example 142 | Example 143 | Example 144 | Example 145 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 20.0 | 18.0 | 16.0 | 44.0 | 42.0 | 40.0 | 38.0 | 36.0 |
| R1234yf | mass % | 24.0 | 24.0 | 24.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 97.7 | 97.9 | 98.1 | 95.3 | 95.5 | 95.7 | 95.9 | 96.1 |
| Refrigerating capacity ratio | % (relative to 410A) | 91.6 | 91.3 | 91.0 | 93.2 | 93.1 | 92.9 | 92.7 | 92.5 |
| Condensation glide | °C. | 2.28 | 2.22 | 2.16 | 2.86 | 2.85 | 2.83 | 2.81 | 2.79 |
| Discharge pressure | % (relative to 410A) | 96.2 | 95.6 | 95.1 | 101.3 | 100.8 | 100.4 | 99.9 | 99.4 |
| RCL | g/m³ | 41.8 | 41.1 | 40.4 | 53.7 | 52.6 | 51.5 | 50.4 | 49.4 |

TABLE 24

| Item | Unit | Example 146 | Example 147 | Example 148 | Example 149 | Example 150 | Example 151 | Example 152 | Example 153 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 34.0 | 32.0 | 30.0 | 28.0 | 26.0 | 24.0 | 22.0 | 20.0 |
| R1234yf | mass % | 26.0 | 26.0 | 26.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 96.3 | 96.5 | 96.7 | 96.9 | 97.1 | 97.3 | 97.5 | 97.7 |
| Refrigerating capacity ratio | % (relative to 410A) | 92.3 | 92.1 | 91.9 | 91.6 | 91.4 | 91.2 | 90.9 | 90.6 |
| Condensation glide | °C. | 2.77 | 2.74 | 2.71 | 2.67 | 2.63 | 2.59 | 2.53 | 2.48 |

TABLE 24-continued

| Item | Unit | Example 146 | Example 147 | Example 148 | Example 149 | Example 150 | Example 151 | Example 152 | Example 153 |
|---|---|---|---|---|---|---|---|---|---|
| Discharge pressure | % (relative to 410A) | 99.0 | 98.5 | 97.9 | 97.4 | 96.9 | 96.4 | 95.8 | 95.3 |
| RCL | g/m³ | 48.4 | 47.4 | 46.5 | 45.7 | 44.8 | 44.0 | 43.2 | 42.5 |

TABLE 25

| Item | Unit | Example 154 | Example 155 | Example 156 | Example 157 | Example 158 | Example 159 | Example 160 | Example 161 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 18.0 | 16.0 | 14.0 | 42.0 | 40.0 | 38.0 | 36.0 | 34.0 |
| R1234yf | mass % | 26.0 | 26.0 | 26.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 97.9 | 98.2 | 98.4 | 95.6 | 95.8 | 96.0 | 96.2 | 96.3 |
| Refrigerating capacity ratio | % (relative to 410A) | 90.3 | 90.1 | 89.8 | 92.1 | 91.9 | 91.7 | 91.5 | 91.3 |
| Condensation glide | ° C. | 2.42 | 2.35 | 2.27 | 3.10 | 3.09 | 3.06 | 3.04 | 3.01 |
| Discharge pressure | % (relative to 410A) | 94.7 | 94.1 | 93.6 | 99.7 | 99.3 | 98.8 | 98.4 | 97.9 |
| RCL | g/m³ | 41.7 | 41.0 | 40.3 | 53.6 | 52.5 | 51.4 | 50.3 | 49.3 |

TABLE 26

| Item | Unit | Example 162 | Example 163 | Example 164 | Example 165 | Example 166 | Example 167 | Example 168 | Example 169 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 32.0 | 30.0 | 28.0 | 26.0 | 24.0 | 22.0 | 20.0 | 18.0 |
| R1234yf | mass % | 28.0 | 28.0 | 28.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 96.5 | 96.7 | 96.9 | 97.2 | 97.4 | 97.6 | 97.8 | 98.0 |
| Refrigerating capacity ratio | % (relative to 410A) | 91.1 | 90.9 | 90.7 | 90.4 | 90.2 | 89.9 | 89.7 | 89.4 |
| Condensation glide | ° C. | 2.98 | 2.94 | 2.90 | 2.85 | 2.80 | 2.75 | 2.68 | 2.62 |
| Discharge pressure | % (relative to 410A) | 97.4 | 96.9 | 96.4 | 95.9 | 95.4 | 94.9 | 94.3 | 93.8 |
| RCL | g/m³ | 48.3 | 47.4 | 46.4 | 45.6 | 44.7 | 43.9 | 43.1 | 42.4 |

TABLE 27

| Item | Unit | Example 170 | Example 171 | Example 172 | Example 173 | Example 174 | Example 175 | Example 176 | Example 177 |
|---|---|---|---|---|---|---|---|---|---|
| HFO-1132(E) | mass % | 56.0 | 58.0 | 60.0 | 32.0 | 34.0 | 36.0 | 38.0 | 42.0 |
| HFO-1123 | mass % | 16.0 | 14.0 | 12.0 | 38.0 | 36.0 | 34.0 | 32.0 | 28.0 |
| R1234yf | mass % | 28.0 | 28.0 | 28.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 98.2 | 98.4 | 98.6 | 96.1 | 96.2 | 96.4 | 96.6 | 97.0 |
| Refrigerating capacity ratio | % (relative to 410A) | 89.1 | 88.8 | 88.5 | 90.7 | 90.5 | 90.3 | 90.1 | 89.7 |
| Condensation glide | ° C. | 2.54 | 2.46 | 2.38 | 3.32 | 3.30 | 3.26 | 3.22 | 3.14 |
| Discharge pressure | % (relative to 410A) | 93.2 | 92.6 | 92.1 | 97.7 | 97.3 | 96.8 | 96.4 | 95.4 |
| RCL | g/m³ | 41.7 | 41.0 | 40.3 | 52.4 | 51.3 | 50.2 | 49.2 | 47.3 |

TABLE 28

| Item | Unit | Example 178 | Example 179 | Example 180 | Example 181 | Example 182 | Example 183 | Example 184 | Example 185 |
|---|---|---|---|---|---|---|---|---|---|
| HFO-1132(E) | mass % | 44.0 | 46.0 | 48.0 | 50.0 | 52.0 | 54.0 | 56.0 | 58.0 |
| HFO-1123 | mass % | 26.0 | 24.0 | 22.0 | 20.0 | 18.0 | 16.0 | 14.0 | 12.0 |
| R1234yf | mass % | 30.0 | 30.0 | 30.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 97.2 | 97.4 | 97.6 | 97.8 | 98.0 | 98.3 | 98.5 | 98.7 |
| Refrigerating capacity ratio | % (relative to 410A) | 89.4 | 89.2 | 89.0 | 88.7 | 88.4 | 88.2 | 87.9 | 87.6 |
| Condensation glide | °C. | 3.08 | 3.03 | 2.97 | 2.90 | 2.83 | 2.75 | 2.66 | 2.57 |
| Discharge pressure | % (relative to 410A) | 94.9 | 94.4 | 93.9 | 93.3 | 92.8 | 92.3 | 91.7 | 91.1 |
| RCL | g/m$^3$ | 46.4 | 45.5 | 44.7 | 43.9 | 43.1 | 42.3 | 41.6 | 40.9 |

TABLE 29

| Item | Unit | Example 186 | Example 187 | Example 188 | Example 189 | Example 190 | Example 191 | Example 192 | Example 193 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 38.0 | 36.0 | 34.0 | 32.0 | 30.0 | 28.0 | 26.0 | 24.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 96.2 | 96.3 | 96.5 | 96.7 | 96.9 | 97.1 | 97.3 | 97.5 |
| Refrigerating capacity ratio | % (relative to 410A) | 89.6 | 89.5 | 89.3 | 89.1 | 88.9 | 88.7 | 88.4 | 88.2 |
| Condensation glide | °C. | 3.60 | 3.56 | 3.52 | 3.48 | 3.43 | 3.38 | 3.33 | 3.26 |
| Discharge pressure | % (relative to 410A) | 96.6 | 96.2 | 95.7 | 95.3 | 94.8 | 94.3 | 93.9 | 93.4 |
| RCL | g/m$^3$ | 53.4 | 52.3 | 51.2 | 50.1 | 49.1 | 48.1 | 47.2 | 46.3 |

TABLE 30

| Item | Unit | Example 194 | Example 195 | Example 196 | Example 197 | Example 198 | Example 199 | Example 200 | Example 201 |
|---|---|---|---|---|---|---|---|---|---|
| HFO-1132(E) | mass % | 46.0 | 48.0 | 50.0 | 52.0 | 54.0 | 56.0 | 58.0 | 60.0 |
| HFO-1123 | mass % | 22.0 | 20.0 | 18.0 | 16.0 | 14.0 | 12.0 | 10.0 | 8.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 97.7 | 97.9 | 98.1 | 98.3 | 98.5 | 98.7 | 98.9 | 99.2 |
| Refrigerating capacity ratio | % (relative to 410A) | 88.0 | 87.7 | 87.5 | 87.2 | 86.9 | 86.6 | 86.3 | 86.0 |
| Condensation glide | °C. | 3.20 | 3.12 | 3.04 | 2.96 | 2.87 | 2.77 | 2.66 | 2.55 |
| Discharge pressure | % (relative to 410A) | 92.8 | 92.3 | 91.8 | 91.3 | 90.7 | 90.2 | 89.6 | 89.1 |
| RCL | g/m$^3$ | 45.4 | 44.6 | 43.8 | 43.0 | 42.3 | 41.5 | 40.8 | 40.2 |

TABLE 31

| Item | Unit | Example 202 | Example 203 | Example 204 | Example 205 | Example 206 | Example 207 | Example 208 | Example 209 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 36.0 | 34.0 | 32.0 | 30.0 | 28.0 | 26.0 | 24.0 | 22.0 |
| R1234yf | mass % | 34.0 | 34.0 | 34.0 | 34.0 | 34.0 | 34.0 | 34.0 | 34.0 |
| GWP | — | 2 | 2 | 2 | 2 | 2 | 2 | 2 | 2 |
| COP ratio | % (relative to 410A) | 96.5 | 96.6 | 96.8 | 97.0 | 97.2 | 97.4 | 97.6 | 97.8 |

TABLE 31-continued

| Item | Unit | Example 202 | Example 203 | Example 204 | Example 205 | Example 206 | Example 207 | Example 208 | Example 209 |
|---|---|---|---|---|---|---|---|---|---|
| Refrigerating capacity ratio | % (relative to 410A) | 88.4 | 88.2 | 88.0 | 87.8 | 87.6 | 87.4 | 87.2 | 87.0 |
| Condensation glide | °C. | 3.84 | 3.80 | 3.75 | 3.70 | 3.64 | 3.58 | 3.51 | 3.43 |
| Discharge pressure | % (relative to 410A) | 95.0 | 94.6 | 94.2 | 93.7 | 93.3 | 92.8 | 92.3 | 91.8 |
| RCL | g/m$^3$ | 53.3 | 52.2 | 51.1 | 50.0 | 49.0 | 48.0 | 47.1 | 46.2 |

TABLE 32

| Item | Unit | Example 210 | Example 211 | Example 212 | Example 213 | Example 214 | Example 215 | Example 216 | Example 217 |
|---|---|---|---|---|---|---|---|---|---|
| HFO-1132(E) | mass % | 46.0 | 48.0 | 50.0 | 52.0 | 54.0 | 30.0 | 32.0 | 34.0 |
| HFO-1123 | mass % | 20.0 | 18.0 | 16.0 | 14.0 | 12.0 | 34.0 | 32.0 | 30.0 |
| R1234yf | mass % | 34.0 | 34.0 | 34.0 | 34.0 | 34.0 | 36.0 | 36.0 | 36.0 |
| GWP | — | 2 | 2 | 2 | 2 | 2 | 2 | 2 | 2 |
| COP ratio | % (relative to 410A) | 98.0 | 98.2 | 98.4 | 98.6 | 98.8 | 96.8 | 96.9 | 97.1 |
| Refrigerating capacity ratio | % (relative to 410A) | 86.7 | 86.5 | 86.2 | 85.9 | 85.6 | 87.2 | 87.0 | 86.8 |
| Condensation glide | °C. | 3.36 | 3.27 | 3.18 | 3.08 | 2.97 | 4.08 | 4.03 | 3.97 |
| Discharge pressure | % (relative to 410A) | 91.3 | 90.8 | 90.3 | 89.7 | 89.2 | 93.4 | 93.0 | 92.6 |
| RCL | g/m$^3$ | 45.3 | 44.5 | 43.7 | 42.9 | 42.2 | 53.2 | 52.1 | 51.0 |

TABLE 33

| Item | Unit | Example 218 | Example 219 | Example 220 | Example 221 | Example 222 | Example 223 | Example 224 | Example 225 |
|---|---|---|---|---|---|---|---|---|---|
| HFO-1132(E) | mass % | 36.0 | 38.0 | 40.0 | 42.0 | 44.0 | 46.0 | 30.0 | 32.0 |
| HFO-1123 | mass % | 28.0 | 26.0 | 24.0 | 22.0 | 20.0 | 18.0 | 32.0 | 30.0 |
| R1234yf | mass % | 36.0 | 36.0 | 36.0 | 36.0 | 36.0 | 36.0 | 38.0 | 38.0 |
| GWP | — | 2 | 2 | 2 | 2 | 2 | 2 | 2 | 2 |
| COP ratio | % (relative to 410A) | 97.3 | 97.5 | 97.7 | 97.9 | 98.1 | 98.3 | 97.1 | 97.2 |
| Refrigerating capacity ratio | % (relative to 410A) | 86.6 | 86.4 | 86.2 | 85.9 | 85.7 | 85.5 | 85.9 | 85.7 |
| Condensation glide | °C. | 3.91 | 3.84 | 3.76 | 3.68 | 3.60 | 3.50 | 4.32 | 4.25 |
| Discharge pressure | % (relative to 410A) | 92.1 | 91.7 | 91.2 | 90.7 | 90.3 | 89.8 | 91.9 | 91.4 |
| RCL | g/m3 | 49.9 | 48.9 | 47.9 | 47.0 | 46.1 | 45.3 | 53.1 | 52.0 |

TABLE 34

| Item | Unit | Example 226 | Example 227 |
|---|---|---|---|
| HFO-1132(E) | mass % | 34.0 | 36.0 |
| HFO-1123 | mass % | 28.0 | 26.0 |
| R1234yf | mass % | 38.0 | 38.0 |
| GWP | — | 2 | 2 |
| COP ratio | % (relative to 410A) | 97.4 | 97.6 |
| Refrigerating capacity ratio | % (relative to 410A) | 85.6 | 85.3 |
| Condensation glide | °C. | 4.18 | 4.11 |
| Discharge pressure | % (relative to 410A) | 91.0 | 90.6 |
| RCL | g/m$^3$ | 50.9 | 49.8 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segment CO);
the line segment AA' is represented by coordinates (x, 0.0016x$^2$−0.9473x+57.497, −0.0016x$^2$−0.0527x+42.503),
the line segment A'B is represented by coordinates (x, 0.0029x$^2$−1.0268x+58.7, −0.0029x$^2$+0.0268x+41.3, the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments BD, CO, and OA are straight lines, the refrigerant has a refrigerating capacity ratio of 85% or more relative to that of R410A, and a COP of 92.5% or more relative to that of R410A.

The point on the line segment AA' was determined by obtaining an approximate curve connecting point A, Example 1, and point A' by the least square method.

The point on the line segment A'B was determined by obtaining an approximate curve connecting point A', Example 3, and point B by the least square method.

The point on the line segment DC' was determined by obtaining an approximate curve connecting point D, Example 6, and point C' by the least square method.

The point on the line segment C'C was determined by obtaining an approximate curve connecting point C', Example 4, and point C by the least square method.

Likewise, the results indicate that when coordinates (x,y, z) are within the range of a figure surrounded by line segments AA', A'B, BF, FT, TE, EO, and OA that connect the following 7 points:

point A (68.6, 0.0, 31.4),
point A' (30.6, 30.0, 39.4),
point B (0.0, 58.7, 41.3),
point F (0.0, 61.8, 38.2),
point T (35.8, 44.9, 19.3),
point E (58.0, 42.0, 0.0) and
point O (100.0, 0.0, 0.0), or on the above line segments (excluding the points on the line EO);

the line segment AA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), and the line segment TE is represented by coordinates (x, $0.0098x^2-0.0398x+42.0$, $-0.0098x^2-0.9602x+58.0$), and the line segments BF, FO, and OA are straight lines, the refrigerant has a refrigerating capacity ratio of 85% or more relative to that of R410A, and a COP of 95% or more relative to that of R410A.

The point on the line segment FT was determined by obtaining an approximate curve connecting three points, i.e., points T, E', and F, by the least square method.

The point on the line segment TE was determined by obtaining an approximate curve connecting three points, i.e., points E, R, and T, by the least square method.

The results in Tables 1 to 34 clearly indicate that in a ternary composition diagram of the mixed refrigerant of HFO-1132(E), HFO-1123, and R1234yf in which the sum of these components is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below the line segment LM connecting point L (63.1, 31.9, 5.0) and point M (60.3, 6.2, 33.5), the refrigerant has an RCL of 40 g/m$^3$ or more.

The results in Tables 1 to 34 clearly indicate that in a ternary composition diagram of the mixed refrigerant of HFO-1132(E), HFO-1123 and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment QR connecting point Q (62.8, 29.6, 7.6) and point R (49.8, 42.3, 7.9) or on the left side of the line segment, the refrigerant has a temperature glide of 1° C. or less.

The results in Tables 1 to 34 clearly indicate that in a ternary composition diagram of the mixed refrigerant of HFO-1132(E), HFO-1123, and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment ST connecting point S (62.6, 28.3, 9.1) and point T (35.8, 44.9, 19.3) or on the right side of the line segment, the refrigerant has a discharge pressure of 105% or less relative to that of 410A.

In these compositions, R1234yf contributes to reducing flammability, and suppressing deterioration of polymerization etc. Therefore, the composition preferably contains R1234yf.

Further, the burning velocity of these mixed refrigerants whose mixed formulations were adjusted to WCF concentrations was measured according to the ANSI/ASHRAE Standard 34-2013. Compositions having a burning velocity of 10 cm/s or less were determined to be classified as "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Each WCFF concentration was obtained by using the WCF concentration as the initial concentration and performing a leak simulation using NIST Standard Reference Database REFLEAK Version 4.0.

Tables 35 and 36 show the results.

TABLE 35

| Item | | Unit | G | H | I |
|---|---|---|---|---|---|
| WCF | HFO-1132(E) | mass % | 72.0 | 72.0 | 72.0 |
| | HFO-1123 | mass % | 28.0 | 9.6 | 0.0 |
| | R1234yf | mass % | 0.0 | 18.4 | 28.0 |
| Burning velocity (WCF) | | cm/s | 10 | 10 | 10 |

TABLE 36

| Item | | Unit | J | P | L | N | N' | K |
|---|---|---|---|---|---|---|---|---|
| WCF | HFO-1132(E) | mass % | 47.1 | 55.8 | 63.1 | 68.6 | 65.0 | 61.3 |
| | HFO-1123 | mass % | 52.9 | 42.0 | 31.9 | 16.2 | 7.7 | 5.4 |
| | R1234yf | mass % | 0.0 | 2.2 | 5.0 | 15.2 | 27.3 | 33.3 |
| Leak condition that results in WCFF | | | Storage/Shipping −40° C., 92% release, liquid phase side | Storage/Shipping −40° C., 90% release, liquid phase side | Storage/Shipping −40° C., 90% release, gas phase side | Storage/Shipping −40° C., 66% release, gas phase side | Storage/Shipping −40° C., 12% release, gas phase side | Storage/Shipping, −40° C., 0% release, gas phase side |
| WCFF | HFO-1132(E) | mass % | 72.0 | 72.0 | 72.0 | 72.0 | 72.0 | 72.0 |
| | HFO-1123 | mass % | 28.0 | 17.8 | 17.4 | 13.6 | 12.3 | 9.8 |
| | R1234yf | mass % | 0.0 | 10.2 | 10.6 | 14.4 | 15.7 | 18.2 |
| Burning velocity (WCF) | | cm/s | 8 or less | 8 or less | 8 or less | 9 | 9 | 8 or less |
| Burning velocity (WCFF) | | cm/s | 10 | 10 | 10 | 10 | 10 | 10 |

The results in Table 35 clearly indicate that when a mixed refrigerant of HFO-1132(E), HFO-1123, and R1234yf contains HFO-1132(E) in a proportion of 72.0 mass % or less based on their sum, the refrigerant can be determined to have a WCF lower flammability.

The results in Tables 36 clearly indicate that in a ternary composition diagram of a mixed refrigerant of HFO-1132(E), HFO-1123, and R1234yf in which their sum is 100 mass %, and a line segment connecting a point (0.0, 100.0, 0.0) and a point (0.0, 0.0, 100.0) is the base,
when coordinates (x,y,z) are on or below the line segments JP, PN, and NK connecting the following 6 points:
point J (47.1, 52.9, 0.0),
point P (55.8, 42.0, 2.2),
point L (63.1, 31.9, 5.0)
point N (68.6, 16.3, 15.1)
point N' (65.0, 7.7, 27.3) and
point K (61.3, 5.4, 33.3),
the refrigerant can be determined to have a WCF lower flammability, and a WCFF lower flammability.
In the diagram, the line segment PN is represented by coordinates (x, $-0.1135x^2+12.112x-280.43$, $0.1135x^2-13.112x+380.43$),
and the line segment NK is represented by coordinates (x, $0.2421x^2-29.955x+931.91$, $-0.2421x^2+28.955x-831.91$).

The point on the line segment PN was determined by obtaining an approximate curve connecting three points, i.e., points P, L, and N, by the least square method.

The point on the line segment NK was determined by obtaining an approximate curve connecting three points, i.e., points N, N', and K, by the least square method.

Description of Reference Numerals

1: Sample cell
2: High-speed camera
3: Xenon lamp
4: Collimating lens
5: Collimating lens
6: Ring filter

The invention claimed is:

1. A composition comprising a refrigerant, the refrigerant comprising trans-1,2-difluoroethylene (HFO-1132(E)), trifluoroethylene (HFO-1123), and 2,3,3,3-tetrafluoro-1-propene (R1234yf),
wherein the composition comprises HFO-1132(E), HFO-1123, and R1234yf in a total amount of 99.5 mass % or more based on the entire refrigerant, and
wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments IA, BD, and CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

2. The composition according to claim 1,
wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);
  the line segment PN is represented by coordinates (x, $-0.1135x^2+12.112x-280.43$, $0.1135x^2-13.112x+380.43$),
  the line segment NK is represented by coordinates (x, $0.2421x^2-29.955x+931.91$, $-0.2421x^2+28.955x-831.91$),
  the line segment KA' is represented by coordinates (x, $0.0016x^2-0.9473x+57.497$, $-0.0016x^2-0.0527x+42.503$),
  the line segment A'B is represented by coordinates (x, $0.0029x^2-1.0268x+58.7$, $-0.0029x^2+0.0268x+41.3$),
  the line segment DC' is represented by coordinates (x, $0.0082x^2-0.6671x+80.4$, $-0.0082x^2-0.3329x+19.6$),
  the line segment C'C is represented by coordinates (x, $0.0067x^2-0.6034x+79.729$, $-0.0067x^2-0.3966x+20.271$), and
  the line segments JP, BD, and CJ are straight lines.

3. The composition according to claim 1,
wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);
  the line segment PL is represented by coordinates (x, $-0.1135x^2+12.112x-280.43$, $0.1135x^2-13.112x+380.43$)
  the line segment MA' is represented by coordinates (x, $0.0016x^2-0.9473x+57.497$, $-0.0016x^2-0.0527x+42.503$),
  the line segment A'B is represented by coordinates (x, $0.0029x^2-1.0268x+58.7$, $-0.0029x^2+0.0268x+41.3$),
  the line segment DC' is represented by coordinates (x, $0.0082x^2-0.6671x+80.4$, $-0.008^2x2-0.3329x+19.6$),
  the line segment C'C is represented by coordinates (x, $0.0067x^2-0.6034x+79.729$, $-0.0067x^2-0.3966x+20.271$), and
  the line segments JP, LM, BD, and CJ are straight lines.

4. The composition according to claim 1,
wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 80.4, 19.6), and
point T (35.8, 44.9, 19.3),
or on the above line segments (excluding the points on the line segment BF);
  the line segment PL is represented by coordinates (x, $-0.1135x^2+12.112x-280.43$, $0.1135x^2-13.112x+380.43$),
  the line segment MA' is represented by coordinates (x, $0.0016x^2-0.9473x+57.497$, $-0.0016x^2-0.0527x+42.503$),
  the line segment A'B is represented by coordinates (x, $0.0034x^2-1.3714x+68.644$, $-0.0034x^2+0.3714x+31.356$),
  the line segment FT is represented by coordinates (x, $0.0078x^2-0.7501x+61.8$, $-0.0078x^2-0.2499x+38.2$),
  the line segment TP is represented by coordinates (x, $0.00672x^2-0.7607x+63.525$, $-0.00672x^2-0.2393x+36.475$), and
  the line segments LM and BF are straight lines.

5. The composition according to claim 1,
wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:
point P (55.8, 42.0, 2.2),
point L (63.1, 31.9, 5.0),
point Q (62.8, 29.6, 7.6), and
point R (49.8, 42.3, 7.9),
or on the above line segments;
  the line segment PL is represented by coordinates (x, $-0.1135x^2+12.112x-280.43$, $0.1135x^2-13.112x+380.43$),
  the line segment RP is represented by coordinates (x, $0.00672x^2-0.7607x+63.525$, $-0.00672x^2-0.2393x+36.475$), and
  the line segments LQ and QR are straight lines.

6. The composition according to claim 1,
wherein, when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:
point S (62.6, 28.3, 9.1),
point M (60.3, 6.2, 33.5),
point A' (30.6, 30.0, 39.4),
point B (0.0, 58.7, 41.3), point F (0.0, 80.4, 19.6), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$)), the line segment TS is represented by coordinates (x, $-0.0017x^2-0.7869x+70.868$, $0.0017x^2-0.2131x+29.132$), and the line segments SM and BF are straight lines.

7. A refrigerating machine comprising the composition according to claim 1 as a working fluid.

8. A refrigerating machine comprising the composition according to claim 2 as a working fluid.

9. A refrigerating machine comprising the composition according to claim 3 as a working fluid.

10. A refrigerating machine comprising the composition according to claim 4 as a working fluid.

11. A refrigerating machine comprising the composition according to claim 5 as a working fluid.

12. A refrigerating machine comprising the composition according to claim 6 as a working fluid.

13. A method for operating a refrigerating machine, comprising the step of circulating the composition according to claim 1 as a working fluid in a refrigerating machine.

14. A method for operating a refrigerating machine, comprising the step of circulating the composition according to claim 2 as a working fluid in a refrigerating machine.

15. A method for operating a refrigerating machine, comprising the step of circulating the composition according to claim 3 as a working fluid in a refrigerating machine.

16. A method for operating a refrigerating machine, comprising the step of circulating the composition according to claim 4 as a working fluid in a refrigerating machine.

17. A method for operating a refrigerating machine, comprising the step of circulating the composition according to claim 5 as a working fluid in a refrigerating machine.

18. A method for operating a refrigerating machine, comprising the step of circulating the composition according to claim 6 as a working fluid in a refrigerating machine.

\* \* \* \* \*